(12) United States Patent
Rubanovich et al.

(10) Patent No.: US 12,351,088 B2
(45) Date of Patent: Jul. 8, 2025

(54) REAR SEATING FOR UTILITY VEHICLE

(71) Applicant: Polaris Industries Inc., Medina, MN (US)

(72) Inventors: Boris Rubanovich, Oak Grove, MN (US); Aaron D. Deckard, Zionsville, IN (US)

(73) Assignee: Polaris Industries Inc., Medina, MN (US)

( * ) Notice: Subject to any disclaimer, the term of this patent is extended or adjusted under 35 U.S.C. 154(b) by 257 days.

(21) Appl. No.: 17/895,833

(22) Filed: Aug. 25, 2022

(65) Prior Publication Data

US 2023/0064416 A1 Mar. 2, 2023

Related U.S. Application Data

(60) Provisional application No. 63/237,895, filed on Aug. 27, 2021.

(51) Int. Cl.
  *B60N 2/30* (2006.01)

(52) U.S. Cl.
  CPC ............ *B60N 2/3015* (2013.01); *B60N 2/309* (2013.01); *B60Y 2200/124* (2013.01)

(58) Field of Classification Search
  CPC ........ B60N 2/3015; B60N 2/309; B60N 2/36; B60N 2/3047; B60P 3/423; B60P 7/14
  See application file for complete search history.

(56) References Cited

U.S. PATENT DOCUMENTS

| | | | | |
|---|---|---|---|---|
| 6,224,132 | B1 * | 5/2001 | Neale | B60N 2/3015 296/68.1 |
| 2003/0011212 | A1 * | 1/2003 | Hashimoto | B62D 47/003 296/190.11 |
| 2009/0256388 | A1 * | 10/2009 | Tanaka | B60N 2/305 296/64 |
| 2011/0156420 | A1 * | 6/2011 | Yasui | B60N 2/7011 296/183.1 |
| 2011/0156433 | A1 * | 6/2011 | Horiuchi | B60P 1/286 296/65.09 |
| 2011/0187178 | A1 * | 8/2011 | King | B60P 3/423 296/184.1 |
| 2022/0017002 | A1 * | 1/2022 | Park | B60N 2/305 |

* cited by examiner

*Primary Examiner* — Daniel J Colilla
(74) *Attorney, Agent, or Firm* — Merchant & Gould P.C.

(57) ABSTRACT

A vehicle includes a frame and a plurality of seats supported by the frame including at least one front seat and at least one rear seat. The at least one rear seat includes a seat back and a seat base, the seat back and the seat base being moveable between a lowered position and a raised position. The raised position is defined by the seat back and the seat base of the at least one rear seat being positioned at a first vertical height. The lowered position is defined by the seat back and the seat base of the at least one rear seat being positioned longitudinally rearward of the at last one front seat and at a second vertical height, the first vertical height being greater than the second vertical height.

21 Claims, 20 Drawing Sheets

REAR SEATING FOR UTILITY VEHICLE

CROSS-REFERENCE TO RELATED APPLICATIONS

This application claims the benefit of U.S. Provisional Patent Application No. 63/237,895, filed Aug. 27, 2021, entitled "Rear Seating for Utility Vehicle," the contents of which are expressly incorporated by reference herein.

FIELD OF THE DISCLOSURE

The present invention relates generally to a removable rear seating assembly for a vehicle.

BACKGROUND OF THE DISCLOSURE

During the use of various vehicles such as utility vehicles, all-terrain vehicles, and others, it may be beneficial to have rear seating which is stowable when not in use. There are various removable rear seating assemblies known in the art but they may often require complete removal of the seats from the vehicle, may compromise at least the cargo utility of the vehicle, and/or may not optimize passenger comfort. Thus, there remains a need for a rear seating assembly that has the capability of supporting at least one rear passenger with retained comfort and safety and which is also stowable for increased storage space.

SUMMARY OF THE DISCLOSURE

In one embodiment of the present disclosure, a vehicle includes a frame and a plurality of seats supported by the frame, the plurality of seats including at least one front seat and at least one rear seat. The at least one rear seat includes a seat back and a seat base. The seat back and the seat base are moveable between a lowered position and a raised position. The raised position is defined by the seat back and the seat base of the at least one rear seat being positioned at a first vertical height and the lowered position is defined by the seat base and the seat back of the at least one rear seat being positioned longitudinally rearward of the at least one front seat and at a second vertical height, the first vertical height being greater than the second vertical height.

In another embodiment of the present disclosure, a vehicle includes a frame, a plurality of ground-engaging members supporting the frame, a body assembly supported by the frame, a plurality of seats including at least one seat and at least one rear seat and a frame assembly supporting at least the at least one rear seat. The frame assembly and the at least one rear seat are moveable from a first position to a second position. In the first position, the frame assembly is positioned at a vertical height greater than a vertical height of the at least one front seat and the frame assembly is coupled to the frame of the vehicle at a first coupling position. In the second position the frame assembly is positioned at least partially longitudinally rearward of the at least one front seat and the frame assembly is coupled to the frame at a second coupling position. The second coupling position is spaced from the first coupling position.

In another embodiment of the present disclosure, a vehicle includes a frame supporting an operator area having a plurality of seats including at least one rear seat and at least one front seat, the at least one rear seat being moveable from a raised position to a lowered position, a plurality of ground engaging members supporting the frame, a body assembly comprising a plurality of body panels supporting the frame, and a cargo assembly supported by the frame. The cargo assembly includes at least two upwardly extending side panels, a base, and a moveable panel extending upwardly from the base. The moveable panel is moveable from a first position to a second position such that when in the first position, a longitudinal length of the cargo assembly is increased, and when in the second position, the longitudinal length of the cargo assembly is decreased relative to in the first position. When the rear seat is in the raised position, the moveable panel is in the first position or the second position, and when the rear seat is in the lowered position, the moveable panel is in the second position.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to any vehicle, whether configured for off-road or on-road use. For example, the present disclosure is applicable to an off-road vehicle with one or more ground-engaging members and a continuously variable transmission, including, but not limited to, all-terrain vehicles, agricultural vehicles, industrial vehicles, tractors, three-wheeled vehicles, and golf carts, and is equally applicable to tractors, agricultural vehicles and equipment, industrial vehicles and equipment, and on-road vehicles, such as cars, trucks, sport utility vehicles, etc.

Figure 1:
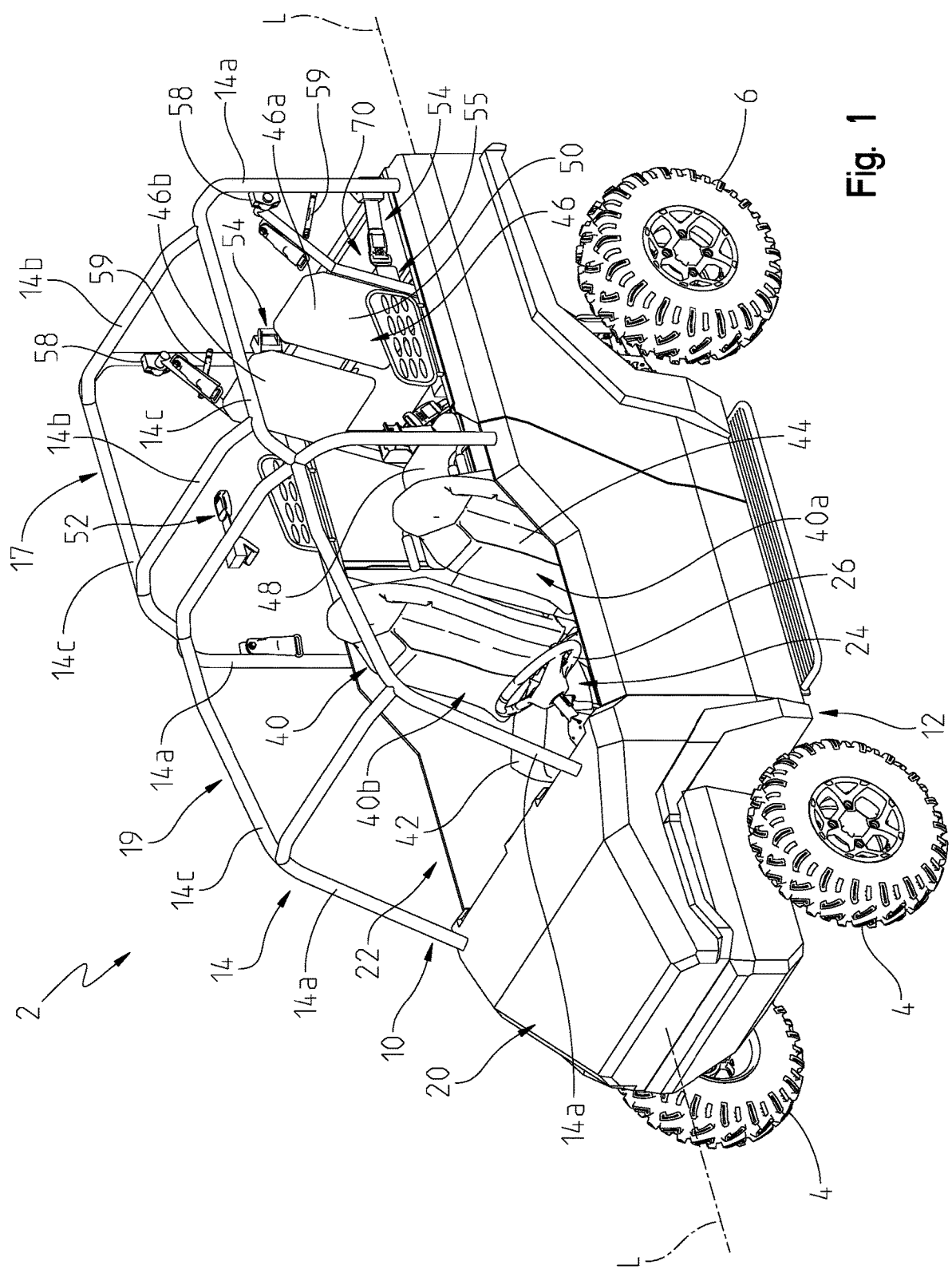
FIG. 1 is a front left perspective view of a utility vehicle including a plurality of front and rear seats.

Referring to FIG. 1, an illustrative embodiment of a utility vehicle 2 is shown. Vehicle 2 is configured for off-road operation, however, the present disclosure is not limited to such a vehicle. Vehicle 2 includes a plurality of front ground-engaging members 4, illustratively front wheels, and a plurality of rear ground-engaging members 6, illustratively rear wheels. In one embodiment, one or more of ground-engaging members 4, 6 may be replaced with tracks, such as the Prospector II Tracks available from Polaris Industries, Inc., located at 2100 Highway 55 in Medina, MN 55340 or non-pneumatic tires, such as those shown in U.S. Pat. Nos. 8,176,957 and 8,104,524, the complete disclosures of which are expressly incorporated herein by reference.

Vehicle 2 further includes a frame assembly 10 defined by a lower frame assembly 12 supported by front ground-engaging members 4 and rear ground-engaging members 6. Additionally, in one embodiment, vehicle 2 may include an upper frame assembly 14 extending vertically above lower frame assembly 12. Upper frame assembly 14 may comprise vertically extending frame members 14a, laterally extending frame members 14b, and longitudinally extending frame members 14c. In various embodiments, upper frame assembly 14 may comprise additional frame members such as frame members extending between laterally extending frame members 14b and/or longitudinally extending frame members 14c. In some embodiments, diagonally extending frame members or downwardly extending frame members may be incorporated. Lower frame assembly 12 supports a cargo assembly 70 and a vehicle body 20, which includes a plurality of body panels, such as a hood, front fender, rear fender, etc.

Figure 2:
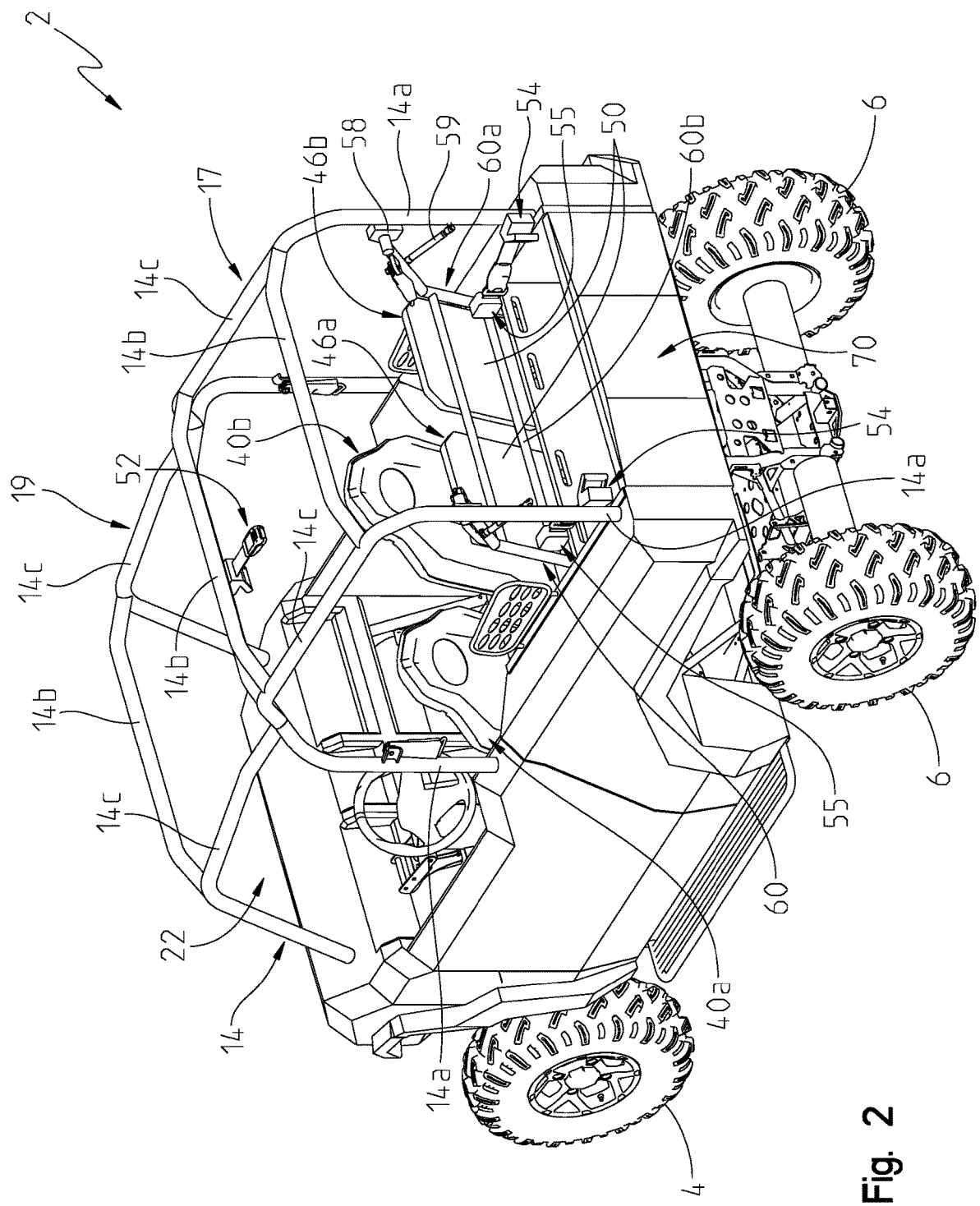
FIG. 2 is rear left perspective view of the utility vehicle of FIG. 1 having a cargo assembly in a first or neutral position.

As illustrated in FIG. 2, upper frame assembly 14 includes two pairs of longitudinally extending frame members 14c. More particularly, upper frame assembly 14 includes a rear pair 17 of longitudinally extending frame members 14c positioned longitudinally rearward of a front pair 19 of longitudinally extending frame members 14c. As illustrated, front pair 19 and rear pair 17 of longitudinally extending frame members 14c are coupled with one another at a rearwardmost extent of each of front pair 19 of longitudinally extending frame members 14c and a forwardmost extent of each of rear pair 17 of longitudinally extending frame members 14c. In this way, and as will be described further, front pair 19 of longitudinally extending frame members 14c may be positioned above a front portion of an operator area 22 while rear pair 17 of longitudinally extending frame members 14c are positioned above a rear passenger portion of operator area 22. In this way, the configuration of upper frame assembly 14 may be described as a "one level" configuration, as front pair 19 and rear pair 17 of longitudinally extending frame members 14c extend upwardly to a generally equal height. However, various other configurations of longitudinally extending frame members 14c may be incorporated, as will be described further with reference to FIGS. 15-18.

Vehicle 2 also comprises an operator area 22 comprising a plurality of seats. Operator area 22 further includes a plurality of operator controls 24, such as a steering wheel 26, by which an operator may provide inputs for operating vehicle 2. Various operator controls, including the steering assembly, may be further described in International Patent Application No. PCT/US13/64516, filed on Oct. 11, 2013, the complete disclosure of which is expressly incorporated by reference herein.

Referring still to FIG. 1, vehicle 2 includes a front suspension assembly (not shown) and a rear suspension assembly (not shown), both supported by lower frame assembly 12. Front suspension assembly and rear suspension assembly include shock absorbers. Additional details of the rear suspension assembly and the front suspension assembly may be disclosed in U.S. Pat. No. 9,566,858, issued on Feb. 14, 2017 and U.S. patent application Ser. No. 16/226,797, filed Dec. 20, 2018, the complete disclosures of which are expressly incorporated by reference herein.

Referring still to FIG. 1, vehicle 2 further includes a powertrain assembly (not shown) which is supported by lower frame assembly 12 and includes at least a prime mover, illustratively an engine (not shown), a gear train which may be configured as or include a shiftable transmission (not shown), and a continuously variable transmission ("CVT") (not shown). The powertrain assembly may further include final drives or differentials, for example a front drive and/or a rear drive. It may be appreciated that vehicle 2 may have any powertrain configuration, such as an internal combustion engine, a hybrid powertrain, or an electric powertrain. Further, while a CVT is noted as an option for the powertrain assembly, any transmission or gearbox may be used, such as a shiftable transmission.

The engine may be positioned rearward of operator area 22. While the prime mover is disclosed as engine, the prime mover may be any type of device configured to provide power to vehicle 2, such as an electric motor, a fuel-based engine, a hybrid engine, a generator, etc. The engine may be any size and include any number of cylinders, for example one cylinder, two cylinders, three cylinders, four cylinders, six cylinders, or eight cylinders.

With reference still to FIG. 1, operator area 22 includes the plurality of seats, illustratively, front seats 40 for the operator and one or more passengers and rear seats 46 for one or more passengers. In some embodiments, operator area 22 is exposed to ambient air and is not fully enclosed while in other embodiments operator area 22 may be at least partially enclosed by a roof, doors, windshields, and/or any other component(s). Upper frame assembly 14 may be positioned generally around operator area 22 such that front seats 40 and rear seats 46 are least partially surrounded by upper frame assembly 14. More particularly, and as previously described, front pair 19 of longitudinally extending frame members 14c may at least partially surround front seats 40 and rear pair 17 of longitudinally extending frame members 14c may at least partially surround rear seats 46. Upper frame assembly 14 may be configured such that a field of view of one or more passengers in front seats 40 or rear seats 46 is not impeded by upper frame assembly 14. In various embodiments, front seats 40 may include at least one front seat 40. In various embodiments, front seats 40 may include two front seats 40, for example a first front seat 40a and a second front seat 40b. Rear seats 46 may include at least one rear seat 46. In various embodiments, rear seats 46 may include at least two rear seats 46, for example a first rear seat 46a and a second rear seat 46b. Each of front seats 40 comprises a seat base 42 and a seat back 44 and each of rear seats 46 comprises a seat base 48 and a seat back 50. Front and rear seats 40, 46 may be configured as separate bucket seats or may be bench seats. Rear seats 46 may be positioned in a lowered position or a raised position such that each seat base 48 and seat back 50 may be in the lowered position or the raised position, as will be described further herein. In various embodiments, vehicle 2 may comprise only a single rear seat 46 or may comprise multiple rear seat assemblies such that two or more rear seats are used. For example, vehicle 2 may comprise two rows of rear seats 46 to accommodate at least four rear seats. For the purposes of the disclosure herein, rear seats 46 will be described as comprising two rear seats, but any variations as described above may be used with reference to the description herein.

As illustrated in FIGS. 1 and 2, vehicle 2 comprises a frame assembly 60, also referred to herein as frame members, supporting at least one of rear seats 46. Frame members 60 may include vertically extending frame members 60a on either side of seat back 50 and laterally extending frame members 60b extending across rear portions of seat back 50. Frame members 60 may also extend to support at least a portion of seat base 48 and/or may include additional frame members 60 for supporting seat base 48. While illustrated in the lowered position, rear seats 46 may be positioned in a raised position as will be described further with reference to FIG. 3. In these embodiments, first and second rear seats 46a, 46b and frame members 60 are coupled such that rear seats 46 and frame members 60 move together and form one modular assembly. Frame members 60 of rear seats 46 are configured for providing structure to rear seats 46 when in the lowered position, and for providing additional overhead framing when in the raised position.

Frame members 60 are configured for pivotal but fixed or permanent coupling with upper frame assembly 14. For example, vehicle 2 includes at least two connectors 58 and at least two linear force elements, such as shock members 59, that couple vertically extending frame members 60a to upper frame assembly 14, specifically vertically extending frame members 14a of upper frame assembly 14, and are secured to rear seats 46 in both the raised and lowered positions. In various embodiments, vehicle 2 comprises three or more connectors 58 and/or three or more shock members 59. Connectors 58 may couple to frame members 60 through securing elements, such as hinges or pins, to allow for pivotal or hinged coupling of frame members 60 to upper frame assembly 14. As such, rear seats 46 are able to pivot from the lowered position (FIGS. 1 and 2) to the raised position (FIG. 3) while remaining coupled to upper frame assembly 14 through connectors 58.

Similar to connectors 58, shock members 59 remain coupled to frame members 60 and upper frame assembly 14 because shock members 59 can extend or retract during the transition from lowered to raised position while remaining fixed to frame members 60 and upper frame assembly 14. Shock members 59 extend from various of vertically extending frame members 14a of upper frame assembly 14 to a portion of frame members 60 and may function to bias the rear seats 46 away from vertically extending members 14a from which shock members 59 extend. In this way, when rear seats 46 are manually actuated into the lowered position from the raised position, shock members 59 may absorb force of rear seats 46 transitioning downward and protect frame members 60 and upper frame assembly 14 from colliding, as will be described further with reference to FIGS. 6-8. It may be appreciated that shock members 59 may be configured as any linear force element, such as shock absorbers or struts.

Vehicle 2 further comprises a coupler 52 defining at least a first coupling member positioned on one of laterally extending frame members 14b and at a vertical height greater than a vertical height of front seats 40. Coupler 52 is a receiving portion of a seatbelt assembly, illustratively a female connector of a seatbelt assembly, configured for reversibly engaging with a latch 53 (FIG. 12) of a seatbelt assembly. Latch 53 may be a second coupling member that is attached to rear seats 46. For example, latch 53 is illustratively a male connector of the seatbelt assembly. Latch 53 is coupled to frame members 60 of rear seats 46 through one of various conventional coupling means such as, but not limited to, adhesives and fasteners.

In various embodiments, coupler 52 comprises a belt portion that may extend with coupler 52 outward relative to laterally extending frame members 14b when manually actuated by the operator and/or the passengers to facilitate engagement with latch 53. When coupler 52 and latch 53 are disengaged by the operator and/or the passengers, the belt portion may be retracted into coupler 52 to reduce the space occupied by coupler 52 and the belt portion. In various embodiments, the belt portion may be coupled with latch 53 to facilitate outward extension of latch 53 relative to rear seats 46 to engage with coupler 52. In these embodiments, when disengaged, the belt portion may be retracted into latch 53. In some instances, both coupler 52 and latch 53 each comprise a belt portion. The belt portion may be a seatbelt assembly belt, a string, a rope, or any other suitable extension mechanism.

Vehicle 2 additionally comprises at least one attachment assembly 54 positioned on at least one vertically extending frame member 14a of upper frame assembly 14. In other words, the at least one attachment assembly 54 is longitudinally rearward of front seats 40 and laterally outward relative to rear seats 46. As such, the at least one attachment assembly 54 may be out of a field of view of any passengers of rear seats 46. In the illustrative embodiment of FIGS. 1 and 2, vehicle 2 comprises two attachment assemblies 54. Attachment assemblies 54 illustratively comprise first coupling members, for example female connectors of a seatbelt assembly, configured for removeable coupling with second coupling members, illustratively a plurality of connectors 55 on frame members 60 of rear seats 46. Connectors 55, illustratively male connectors of a seatbelt assembly, are coupled to frame members 60 of rear seats 46 and may be coupled to frame members 60 through conventional coupling members, such as, but not limited to adhesives and fasteners.

Similar to coupler 52 and latch 53, in various embodiments, attachment assemblies 54 comprise one or more belt portions that may extend outwardly with attachment assemblies 54 relative to vertically extending frame members 14*a* to facilitate the engagement between attachment assemblies 54 and connectors 55. When disengaged by the operator and/or the passengers, the belt portions may be retracted into attachment assemblies 54 to reduce the space occupied by attachment assemblies 54. In various embodiments, the one or more belt portions are coupled with connectors 55, and connectors 55 are capable of extending outward relative to rear seats 46 when actuated by the operator and/or the passengers. In these embodiments, when disengaged, the one or more belt portions may be retracted into connectors 55.

In the illustrative embodiments of FIGS. 1 and 2, rear seats 46 are illustrated in the lowered position and engaged by two attachment assemblies 54 while coupler 52 is disengaged with rear seats 46. In other words, connectors 55 are engaged with attachment assemblies 54 through a manual insertion by the operator and/or passenger(s) of connectors 55 into attachment assemblies 54 after rear seats 46 are lowered. This defines a first coupling position wherein the coupling of frame members 60 to upper frame assembly 14 occurs at a position longitudinally rearward of front seats 40. Coupler 52 is disengaged through the manual disengagement of coupler 52 and latch 53 (FIG. 12) attached to rear seats 46. Specifically, coupler 52 may comprise a button, wherein actuation of which allows for the release of coupler 52, although various other mechanisms of release may be incorporated. While in the illustrative embodiments of FIGS. 1 and 2, coupler 52 and attachment assemblies 54 are illustrated generally as seatbelt attachment assemblies between rear seats 46 and upper frame assembly 14, various other embodiments of coupler 52 and attachment assemblies 54 may be used. For example, coupler 52 and/or attachment assembly 54 may be configured as knots, clasps, latches, or any other suitable coupling or latching mechanism. While illustrative coupler 52 and attachment assemblies 54 are shown as manual, seatbelt-type coupling assemblies, it may be appreciated that any other type of coupling assembly, whether manual, magnetic, hydraulic, electronic, or other, can be used.

In some embodiments, attachment assemblies 54 may each comprise a speed sensor such that when attachment assemblies 54 are engaged with rear seats 46 to indicate that rear seats 46 are in the lowered position, a speed limit may be implemented on vehicle 2. In these embodiments, vehicle 2 cannot operate at a speed that is higher than a predetermined speed limit based on whether the seat belt sensor is actuated or not. For example, vehicle 2 may be configured such that when speed sensors are activated through engagement of attachment assemblies 54, vehicle 2 is not able to operate a speed higher than a value of between 30 to 50 miles per hour. In some embodiments, the speed limit value may be 40 miles per hour. This allows for increased safety of based on whether passengers are present in rear seats 46 of vehicle 2 and are utilizing attachment assemblies 54.

As illustrated in at least FIGS. 1 and 2, vehicle 2 further comprises cargo assembly 70 positioned rearward of rear seats 46 and above at least a portion of rear ground-engaging members 6. Cargo assembly 70 may be configured for supporting tools, accessories, or products, that are meant to be carried with vehicle 2. In the illustrative embodiment of FIGS. 1 and 2, cargo assembly 70 is in a first, neutral position such that cargo assembly 70 is relatively flat or horizontal and extends along longitudinal axis L (FIG. 1). However, cargo assembly 70 is capable of pivoting to a second, tilted position such that at least a portion of cargo assembly 70 (e.g., the base or floor) is angled relative to longitudinal axis L. In various configurations, it may be advantageous for the operator to empty various contents from cargo assembly 70 by moving cargo assembly 70 to the tilted position, which can be easily actuated through the pivoting of rear seats 46 to the raised position, as will be described further with reference to FIG. 3. As will be appreciated herein, rear seats 46 are positioned within a portion of cargo assembly 70 when in the lowered position and, as such, are pivoted or rotated to the raised position when it is desired to tilt cargo assembly 70 and/or to utilize the maximum longitudinal length of cargo assembly 70.

Figure 3:
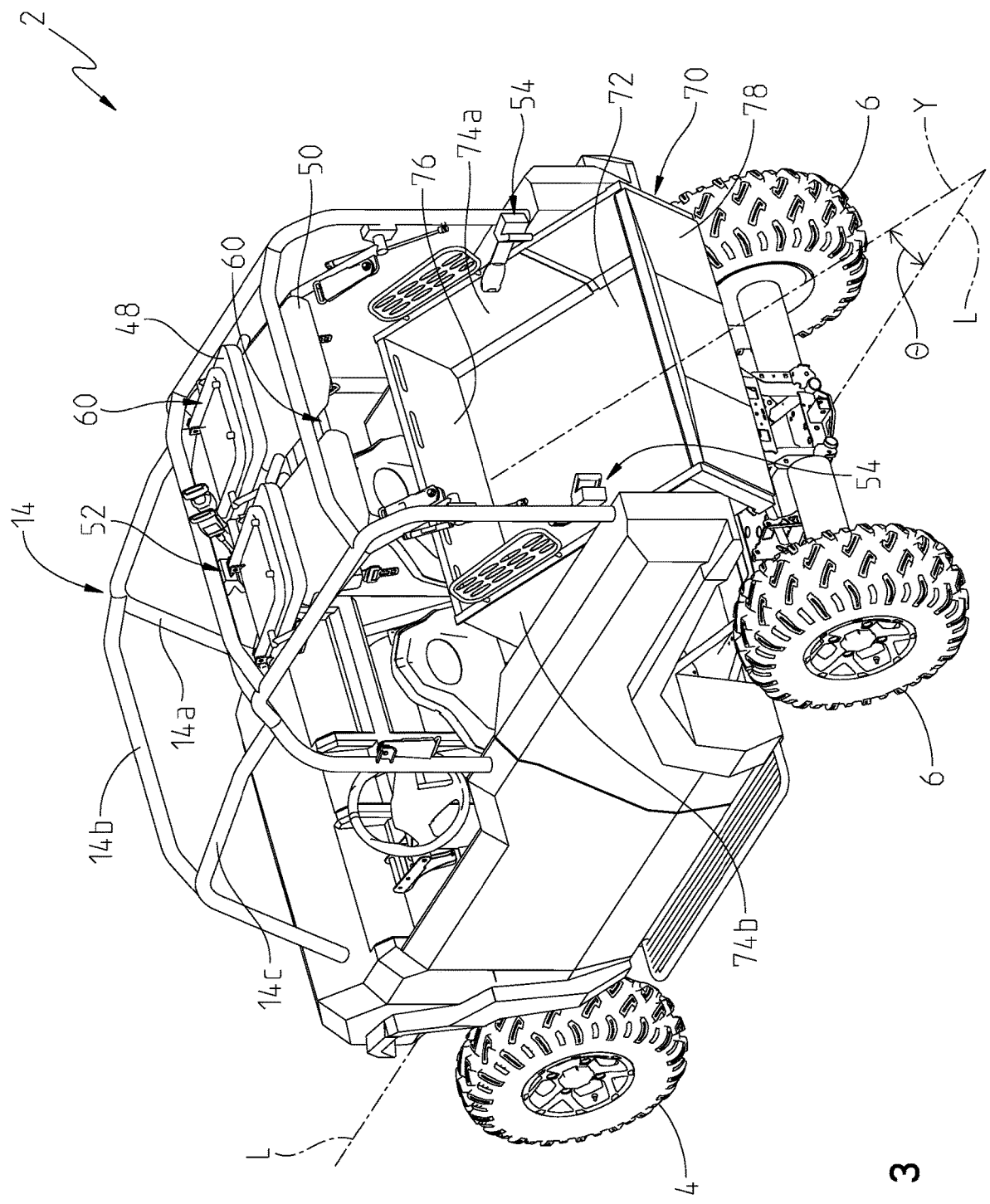
FIG. 3 is a rear left perspective view of utility vehicle of FIG. 2 having the cargo assembly in a second or tilted position and rear seats in a raised or first position.

FIG. 3 is a rear perspective view of vehicle 2 comprising rear seats 46 positioned in the raised position. In this configuration, frame members 60 have been disengaged from attachment assemblies 54, lifted vertically upwards, and secured to longitudinally extending members 14*a* through coupler 52. In this way, coupler 52 retains rear seats 46 in the raised position. This coupling of coupler 52 and frame members 60 defines a second coupling position spaced from the first coupling position and wherein frame members 60 are coupled to upper frame assembly 14 at a vertical height greater than the vertical height of front seats 40. Rear seats 46 are positioned at a first vertical height which is greater than a vertical height of front seats 40 and other components within operator area 22, and at least a portion of rear seats 46 are aligned longitudinally with at least a portion of upper frame assembly 14 when in the raised position. Additionally, while rear seats 46 are in the raised position, frame members 60 are positioned at a first vertical height which is greater than a vertical height of front seats 40. Further, shock members 59 and coupler 52 are used for supporting rear seats 46 in the raised position. For example, as previously described, coupler 52 is capable of engagement with latch 53 (FIG. 12) of rear seats 46. As such, the operator is able to raise the rear seats 46 into the raised position and manually engage coupler 52 and latch 53 through the insertion of latch 53 into coupler 52. Since coupler 52 is secured to at least one of laterally extending frame members 14*b* of upper frame assembly 14, engagement of coupler 52 secures rear seats 46 in the raised position and therefore secures rear seats 46 to the at least one laterally extending frame member 14*b*. Additionally, shock members 59 extend from vertically extending members 14*a* of upper frame assembly 14 and bias rear seats 46 away from vertically extending members 14*a* from which shock members 59 extend. As illustrated in the raised position, shock members 59 extend to retain the connection to rear seats 46 and support rear seats 46 while coupled to the at least one laterally extending frame member 14*b*. In the raised position, frame members 60, specifically longitudinally extending frame members 60*b*, in combination with seat backs 50 of rear seats 46, define additional overhead framing or structure above cargo assembly 70.

As illustrated in FIG. 3, cargo assembly 70 includes a floor or base 72, a plurality of side panels 74 extending vertically upward from base 72, a moveable forward panel 76 extending vertically upward from base 72, and a rear panel 78 extending vertically upward from base 72. In one embodiment, rear panel 78 may define a movable tailgate. Moveable forward panel 76 is positioned at the forwardmost end of cargo assembly 70 relative to rear panel 78 and a longitudinal length between panels 76, 78 defines the longitudinal length of cargo assembly 70. In this embodiment, side panels 74 comprise a first side panel 74a opposite a second side panel 74b, both of which extend approximately parallel longitudinal axis L and approximately perpendicularly to panels 76, 78. Rear panel 78 is positioned at the rearwardmost end of cargo assembly 70 extending upwardly from base 72 and between first and second side panels 74a, 74b. In various embodiments, as will be described further herein, moveable forward panel 76 may be positioned at varying locations within cargo assembly 70 such that it may not be positioned at the forwardmost end of cargo assembly 70 relative to rear panel 78. For example, moveable forward panel 76 may be positioned within a central portion of cargo assembly 70 such that a portion of base 72 and side panels 74 define a forwardmost portion of cargo assembly 70.

While rear seats 46 are in the raised position of FIG. 3, a forward extent of cargo assembly 70 is positioned vertically below rear seats 46 when rear seats 46 are positioned in both the lowered and raised positions. For example, in some embodiments, rear seats 46 are positioned above the forwardmost half (as defined in the longitudinal direction) of base 72 in both the raised and lowered positions of rear seats 46.

In the configuration of FIG. 3, it is further apparent that cargo assembly 70 is also in a tilted position. Since rear seats 46 have been rotated to the raised position and at least a portion of rear seats 46 is longitudinally aligned with upper frame assembly 14, cargo assembly 70 is able to tilt to provide an easier emptying of cargo assembly 70. The tilting of cargo assembly 70 may also be beneficial for accessing components of vehicle 2 such as the engine, or other powertrain assembly components. Upper frame assembly 14 and rear seats 46 are configured such that they do not interfere with cargo assembly 70 when tilted. As illustrated, in the tilted position, a forward end of cargo assembly 70 is lifted upwards while rearward end of cargo assembly 70 may be lowered downwards such that cargo assembly 70 is angled relative to longitudinal axis L. Specifically, a longitudinal axis Y of base 72 of cargo assembly 70 is angled relative to longitudinal axis L of vehicle 2 by angle θ. In various embodiments, angle θ between longitudinal axis Y and longitudinal axis X ranges from 0 degrees to 90 degrees. In preferred embodiments, angle θ is approximately 45 degrees.

Figure 4:
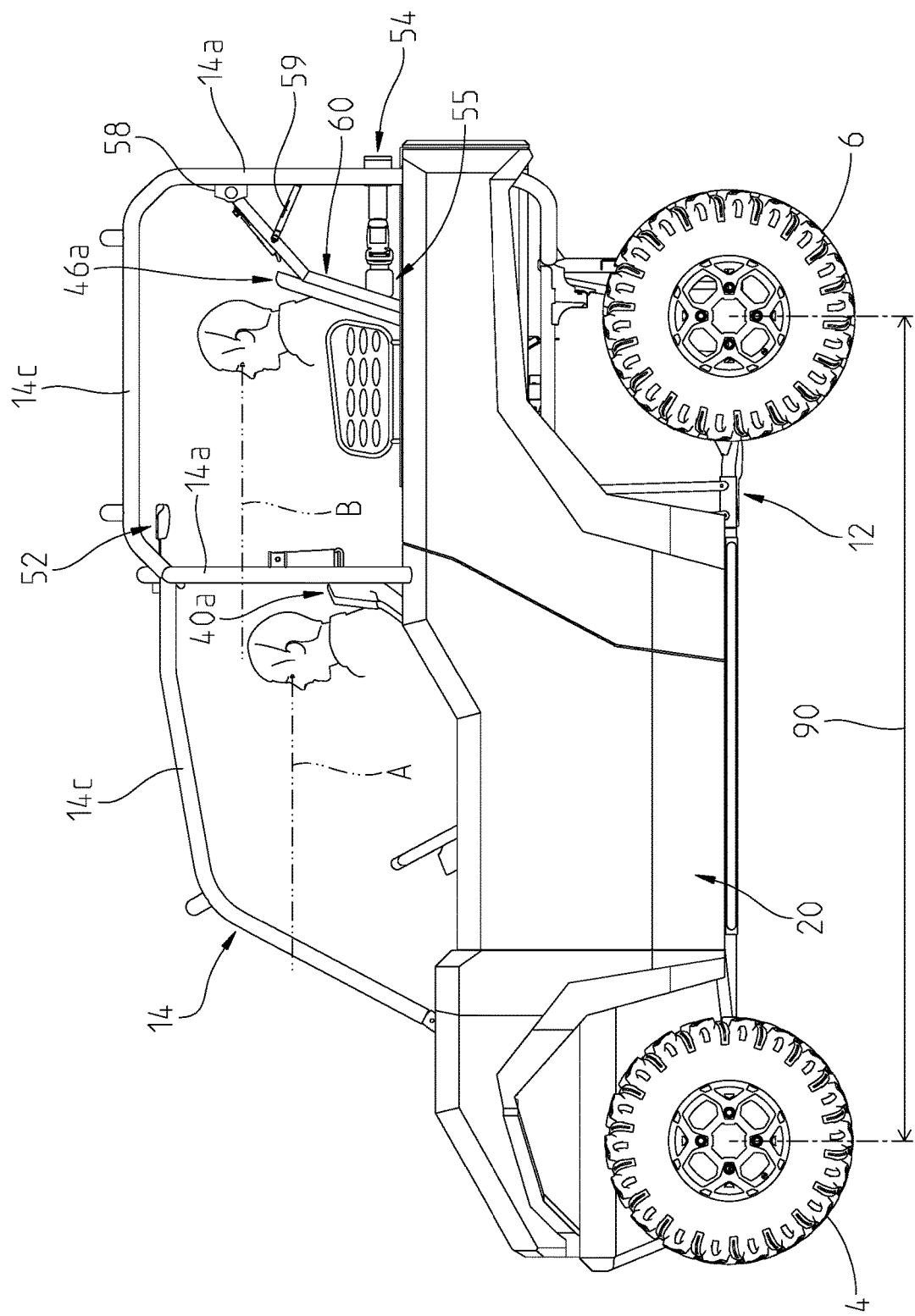
FIG. 4 is a left side view of the utility vehicle of FIG. 1.

FIG. 4 is a left side view of vehicle 2 with rear seats 46 in the lowered position. As shown, rear seats 46 are positioned directly above at least a portion of rear ground-engaging members 6. In the lowered position, rear seats 46 are positioned at a second vertical height that is less than the first vertical height of rear seats 46. Additionally, frame members 60 are positioned at a second vertical height that is less than the first vertical height of frame members 60. An operator is positioned in first front seat 40a and a passenger may be positioned in first rear seat 46a. A first eyeline or line of sight A defines the line of sight of the operator. A second eyeline or line of sight B defines the line of sight of at least one passenger in rear seats 46, illustratively first front seat 46a. First line of sight A is positioned vertically below second line of sight B. This is due to seat base 48 of each the first and second rear seats 46a, 46b being positioned vertically above each seat base 42 of first and second front seats 40a, 40b. In other words, seat base 48 of rear seats 46 is at a vertical height relative to the ground surface that is greater than a vertical height of seat base 42 of front seats 40, thereby defining a seating configuration to allow the rear passengers to generally see over those positioned in front seats 40. In this way, by positioning rear seats 46 vertically higher than front seats 40, this may increase the field of view of the passengers in rear seats 46 such that even when at least the operator is in first front seat 40a, the field of view of the passengers in rear seats is not impacted. Upper frame assembly 14 is configured such that front seats 40 and rear seats 46 each comprise a vertical distance between the front seats 40 and the various frame members of upper frame assembly 14. For example, while rear seats 46 are positioned vertically higher than front seats 40, the vertical distance between seat bases 42 and upper frame assembly 14, for example longitudinally extending frame members 14c, and the vertical distance between seat bases 48 and upper frame assembly 14, for example longitudinally extending frame members 14c, are approximately the same. Upper frame assembly 14 may comprise varying profiles and configurations to accommodate this configuration.

Figure 5:
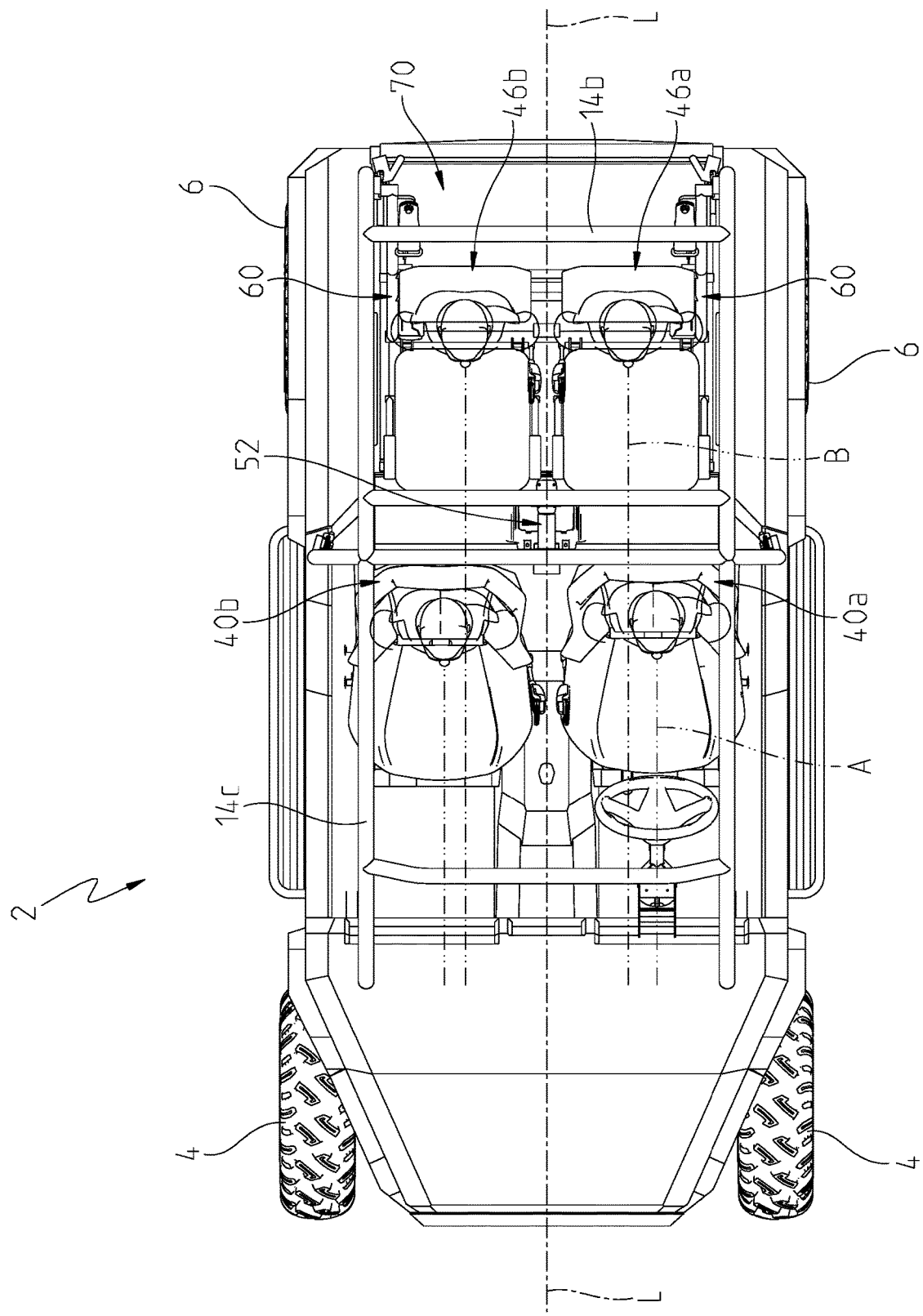
FIG. 5 is a top view of the utility vehicle of FIG. 1.

FIG. 5 illustrates a top view of vehicle 2 with the operator in first front seat 40a, a passenger in second front seat 40b, the passenger in first rear seat 46a, and a passenger in second rear seat 46b. Similar as shown in the FIG. 4, first eyeline A of each of first front seat 40a and of second front seat 40b are illustrated. First eyelines A are generally parallel to one another and laterally spaced by an extent that corresponds to the spacing between first and second front seats 40a, 40b (e.g., a lateral spacing approximately equal to the lateral distance between the lateral midpoints of each of front seats 40). Additionally, second eyeline B of first rear seat 46a is illustrated extending in front of the passenger in the first rear seat 46a. Second eyeline B also extends from the passenger in second rear seat 46b, such that each of second eyelines B extend parallel to one another and are laterally spaced by a distance that corresponds to a spacing between first and second rear seat 46a, 46b (e.g., a lateral spacing approximately equal to the lateral distance between the lateral midpoints of each of rear seats 46). In addition to second eyeline B being positioned at a vertical height greater than that of first eyeline A for increased field of view from rear seats 46 as illustrated in FIG. 4, FIG. 5 illustrates the lateral spacing between first eyelines A and second eyelines B. In these embodiments, each of second eyelines B are positioned laterally closer to longitudinal axis L of vehicle 2 than first eyelines A such that first eyelines A are laterally outward of second eyelines B. This staggered position is due to rear seats 46 being positioned nearer to longitudinal axis L of vehicle 2 in comparison to the positioning of front seats 40. In these embodiments, the laterally and vertically staggered positioning of rear seats 46 and front seats 40 may increase the comfort and experience of the passengers in rear seats 46 through increasing the field of view of the passengers.

Additionally, the above described positioning of rear seats 46 relative to front seats 40 illustrated in FIGS. 4 and 5 allows for a wheel base length 90 to be consistent whether or not rear seats 46 are in the lowered position. As rear seats 46 are positioned within a portion of cargo assembly 70, vehicle 2 accommodates rear passengers on rear seats 46 when rear seats are in the lowered position and, in return, the cargo area/volume of cargo assembly 70 is reduced. Conversely, when rear seats 46 are in the raised position, the cargo area/volume of cargo assembly 70 may be maximized. In this way, and because rear seats 46 are raised and lowered within the existing cargo area, wheel base length 90 does not change to accommodate rear passengers and, instead, rear passengers may be accommodated by merely decreasing the available cargo area/volume to make room for rear seats 46. This may be preferred to allow for vehicle 2 to be more compact as well as reduce alterations to vehicle 2 that are needed to incorporate rear seats 46. The transition from the raised position to the lowered position of rear seats 46 will be illustrated further with reference to FIGS. 6-8.

Figure 6:
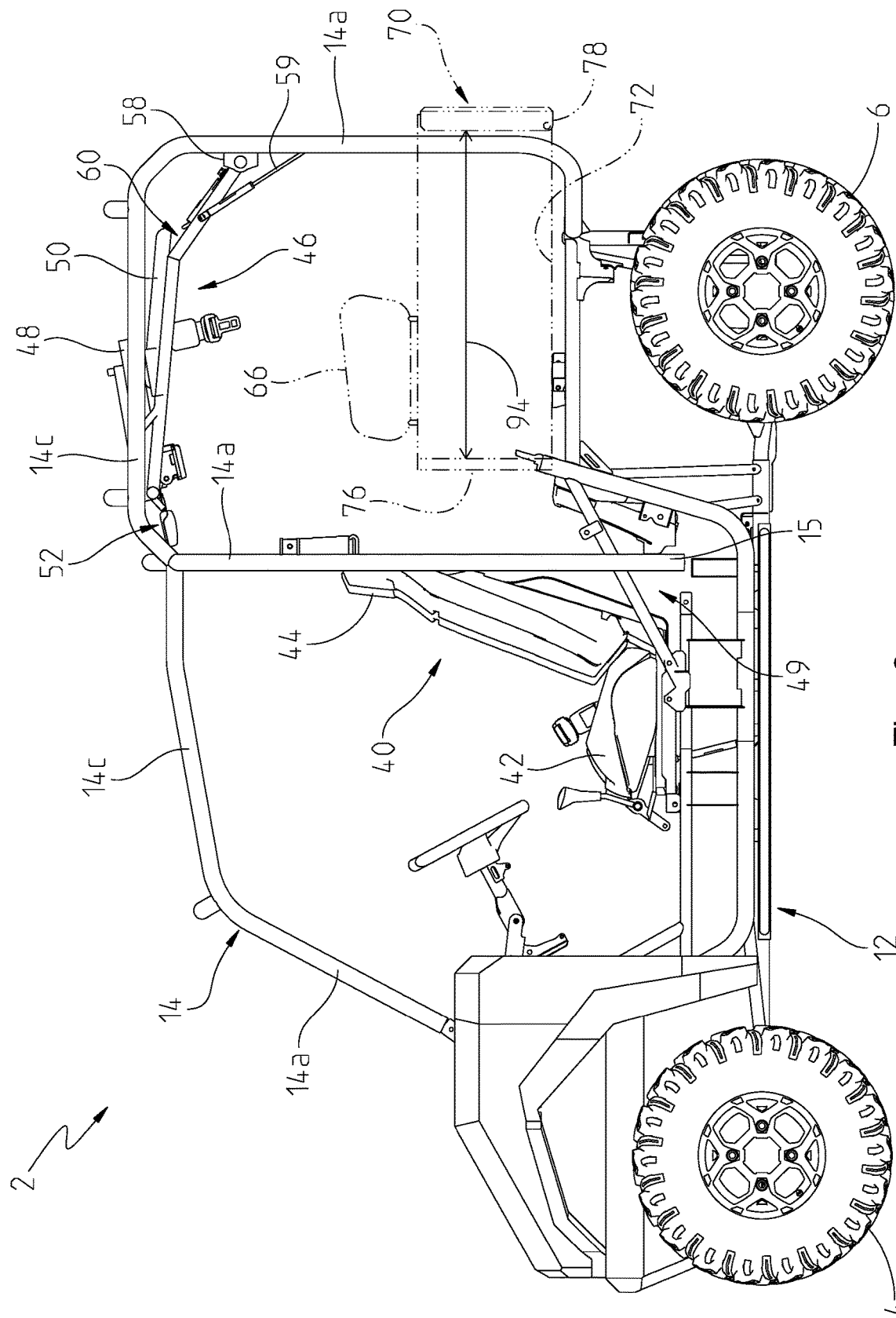
FIG. 6 is a left side view of the utility vehicle of FIG. 1 with a plurality of rear seats in a first position.

FIG. 6 illustrates a left side view of vehicle 2 with various body panels of vehicle body 20 omitted and rear seats 46 positioned in the raised position, wherein rear seats 46 are not currently needed for supporting any rear passengers. The omission of various of body panels allows for cargo assembly 70 and deflection members 66 to be illustrated in phantom. As previously described with reference to FIG. 3, coupler 52 and shock members 59 aid in supporting rear seats 46 while in the raised position. Rear seats 46 and thus frame members 60, are at least partially longitudinally aligned with upper frame assembly 14. As previously mentioned with respect to FIG. 4, upper frame assembly 14 is configured for retaining the vertical distance between seat bases 42 and seat bases 48 of front seats 40 and rear seats 46, respectively, with longitudinally extending frame members 14c, when rear seats 46 are in the lowered position. Similarly, when in the raised positioned as illustrated in FIG. 6, the vertical distance between seat bases 42 and longitudinally extending frame members 14c is maintained consistent with the vertical distance between seat bases 42 and upper frame assembly 14 when in the lowered position. In this way, the space available above the one or more passengers in front seats 46 may be consistent whether rear seats 46 are in the raised or lowered position.

As previously mentioned, since seats of rear seats 46 are in the raised position, the cargo area, or space available for supporting cargo, within cargo assembly 70 may be optimized. For example, in FIG. 6, the cargo volume or area of cargo assembly 70 is maximized because cargo assembly 70 is positioned in the neutral position and moveable panel 76 is positioned at the forwardmost portion of base 72 of cargo assembly 70 since rear seats 46 are not in the lowered position. In this way, a seating area available within cargo assembly 70 for rear seats 46 to be incorporated is reduced. As such, with moveable panel 76 positioned at the forwardmost portion of base 72, cargo assembly 70 has a first base length 94 extending across base 72 of cargo assembly 70 between moveable panel 76 and rear panel 78, thereby defining the maximum cargo area of cargo assembly 70. First base length 94 extends from the forwardmost to the rearwardmost portion of base 72. As will be described further with reference to FIGS. 7-8, first base length 94 is greater than a second base length of cargo assembly 70 which is defined when rear seats 46 are in the lowered position.

Figure 7:
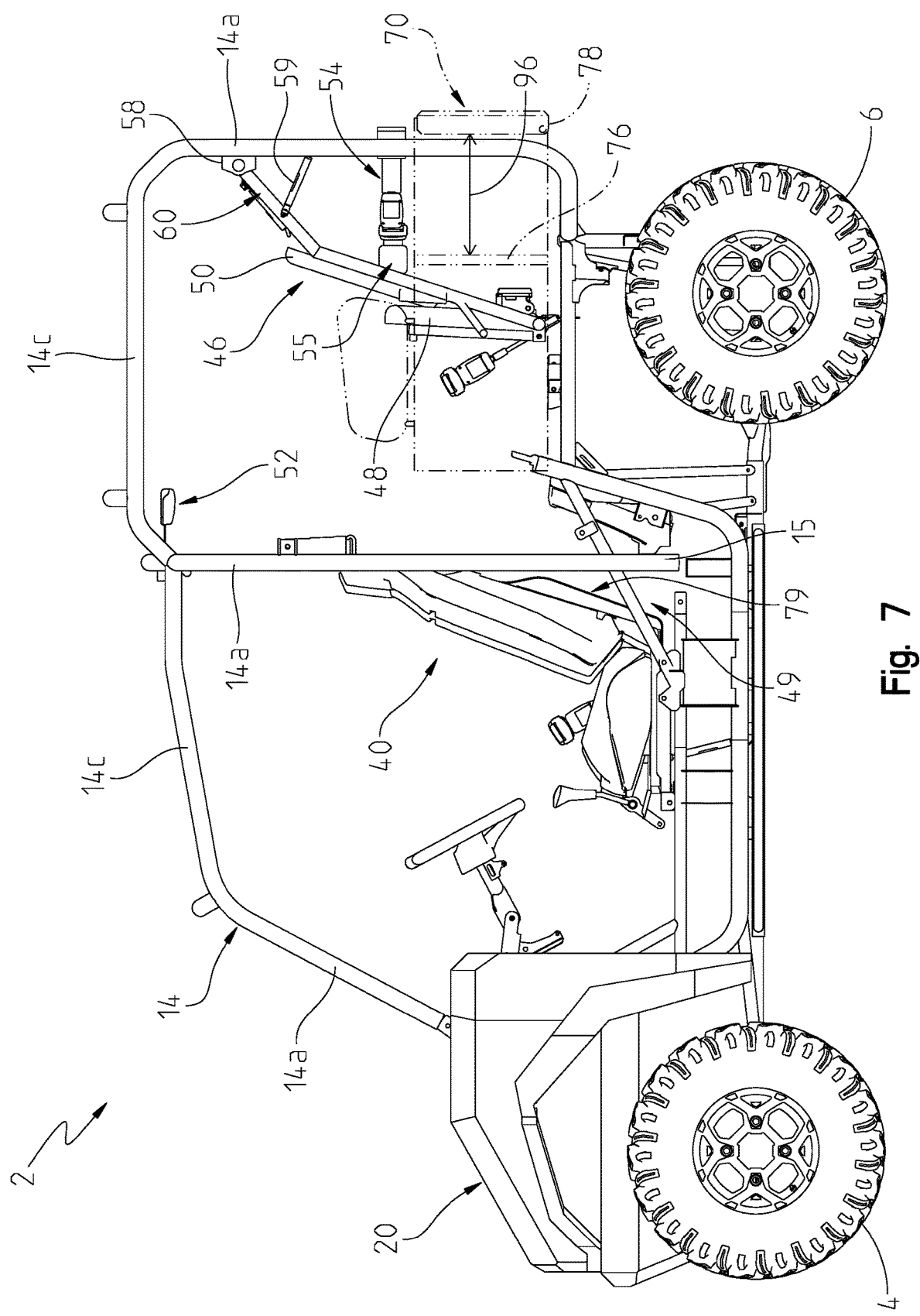
FIG. 7 is a left side view of the utility vehicle of FIG. 6 with the plurality of rear seats in a second position.

For example, FIG. 7 illustrates vehicle 2 with various body panels omitted and rear seats 46 in a transition position where rear seats 46 are partially lowered such that seat backs 50 are lowered but seat bases or bottoms 48 have not been completely lowered. As illustrated in FIG. 7, attachment assemblies 54 are engaged to secure frame members 60 of rear seats 46 to vertically extending members 14a of upper frame assembly 14. Rear seats 46 are able to pivot from the raised position to the lowered position after the release or disengagement of coupler 52. Further, shock members 59 secure upper frame assembly 14 and frame members 60 of rear seats 46 and are configured to compress or extend depending on the location of rear seats 46. Illustratively, as shown in FIG. 6, shock members 59 are compressed. Shock members 59 additionally aid in the absorption of the impact of rear seats 46 being released and lowered, which may reduce degradation and/or damage to frame members 60 and upper frame assembly 14.

Figure 8:
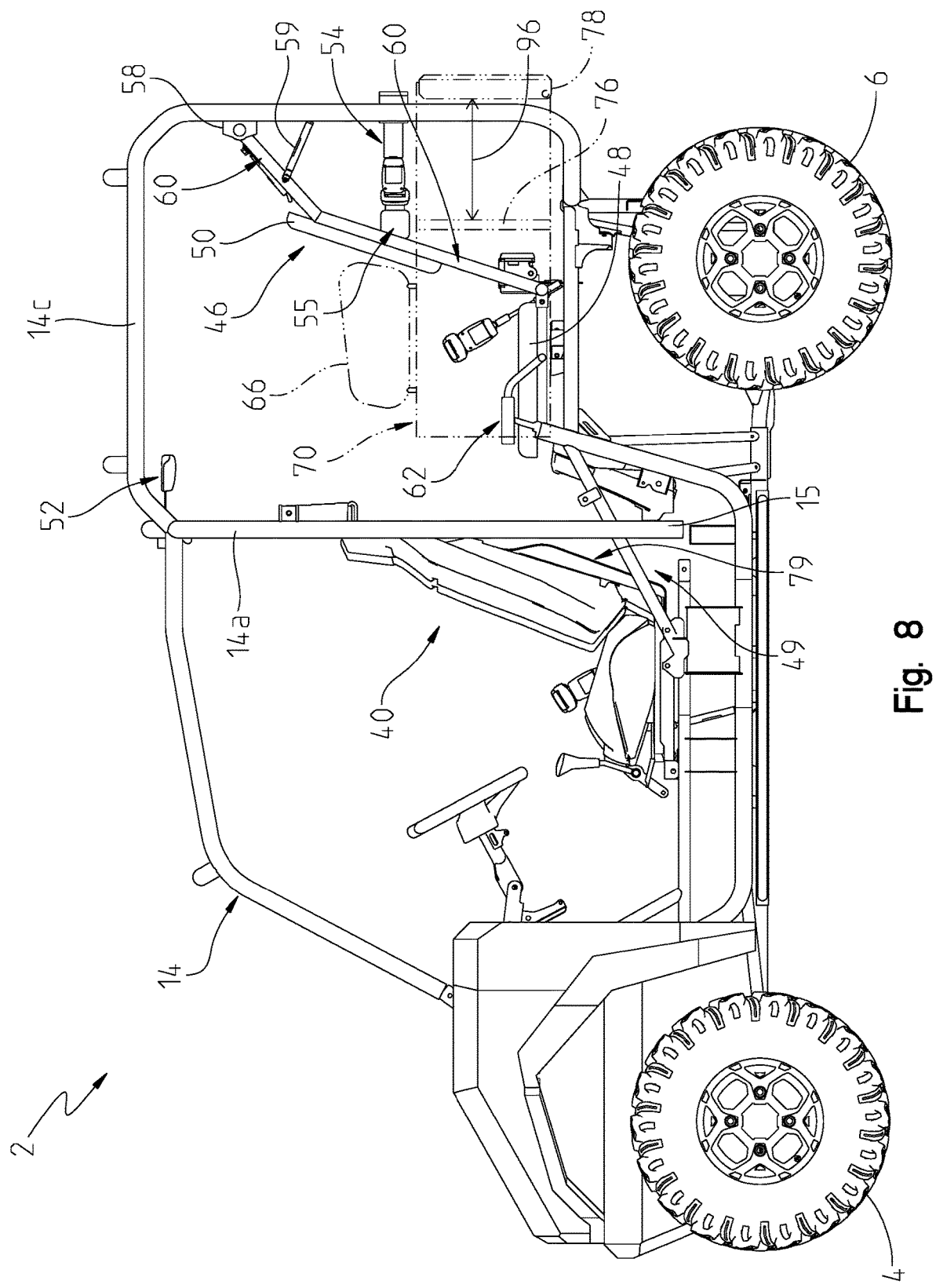
FIG. 8 is a left side view of the utility vehicle of FIG. 6 with the plurality of rear seats in a third position.

As illustrated in FIGS. 7 and 8, when it is desired to have rear seats 46 in the lowered position, moveable panel 76 must be moved from the forwardmost end of base 72 in order to accommodate rear seats 46. As such, movable panel 76 may be removed from that location on base 72 and moved rearwardly to a position near a longitudinal center of base 72, such that the position of moveable panel 76 is relatively rearward with respect to the position of moveable panel 76 in FIG. 6. In these configurations, when rear seats 46 are lowered into the transition position, frame members 60 and seat back 50 of rear seats 46 extend downward into cargo assembly 70 and are positioned forward of moveable panel 76. This reduces the available storage space, or cargo area, of cargo assembly 70, defined by the longitudinal distance between moveable panel 76 and rear panel 78 as the seating area available within cargo assembly 70 for accommodating rear seats 46 is increased. Therefore, accommodation of rear seats 46 within cargo assembly 70 is capable while also retaining some of the storage stage for supporting and carrying tools, accessories, and other desired cargo. In these embodiments, second base length 96 defines the available cargo length of cargo assembly 70 and, as illustrated, second base length 96 is less than first base length 94 shown in FIG. 6. As previously mentioned, seat bases 48 have not been lowered in this transition position and require further manual actuation to be positioned in the lowered position.

FIG. 8 illustrates vehicle 2 with various body panels of vehicle body 20 omitted to illustrate positioning of rear seats 46 while in the lowered position. In this configuration, seat bases 48 of rear seats 46 have been transitioned from extending generally vertically and upwards when in the transition position to extending longitudinally and generally parallel to base 72 of cargo assembly 70 when in the lowered position. Rear seats 46 are secured to upper frame assembly 14 through attachment assemblies 54, as similarly illustrated in the transition position of FIG. 7. In the lowered position, seat bases 48 of rear seats 46 are positioned directly above a portion of base 72 of cargo assembly 70. In one embodiment, seat bases 48 are positioned directly above approximately the forward longitudinal half of base 72. Moveable panel 76 is positioned rearward of seat backs 50 of rear seats 46, such that cargo assembly 70 still retains some available storage space extending between moveable panel 76 and rear panel 78 as defined by second base length 96.

Figure 12:
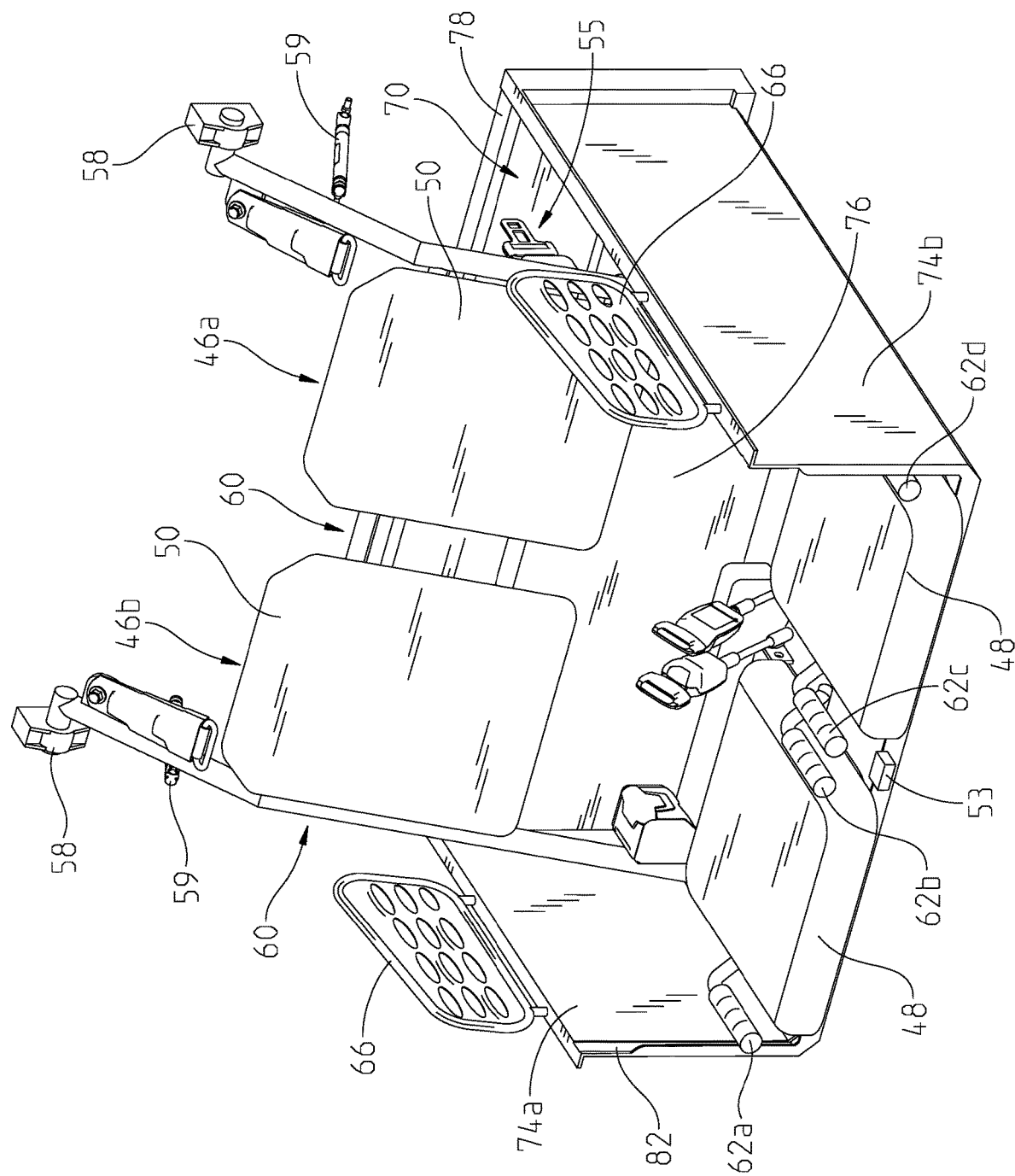
FIG. 12 is a perspective view of a portion of the utility vehicle of FIG. 1 showing the plurality of rear seats of FIG. 8 in the third position and the cargo assembly in the first position of FIG. 2.

Rear seats 46 further comprises a plurality of handles 62 for the passengers, as shown additionally in FIG. 12. Positioning of each handle 62 adjacent seat bases 48 rather than in front of rear seats 46 or on a rear surface of front seats 40 may leave the space forward of the passengers available for increased leg room or arm room for the passengers and/or for storing or supporting accessories or cargo within cargo assembly 70. In various embodiments, handles 62 may be positioned on either side of first and second rear seats 46a, 46b (FIG. 5). Additionally, handles 62 are integrated with frame members 60 of rear seats 46 such that each handle 62 is adjacent seat bases 50 of rear seats 46 in both the raised and the lowered positions. Vehicle 2 additionally comprises deflection members 66 positioned adjacent rear seats 46. These may be configured for at least shielding the rear passengers from mud or debris entering rear seats 46, providing additional protection to the rear passengers on either side of vehicle 2. Additionally illustrated in FIGS. 6-8, vehicle 2 comprises rear footwells 49 for rear seating 46. Rear footwells 49 may extend forward from various vertically extending frame members 14a, for example, a central vertical upstanding member 15 of upper frame assembly 14, and may extend at least partially under front seats 40 to provide increased space for rear passengers to place their feet while in rear seats 46. Rear footwells 49 may also provide space available for storing various cargo items and/or accessories. For example, while rear seats 46 are not in use, the one or more front passengers may use rear footwells 49 for storing bags, tools, coolers, and/or various other cargo items. In some embodiments, rear footwells 49 extend laterally across the width of lower frame assembly 12 of vehicle 2 at a vertical height that is equal to or less than a vertical height of seat bases 42 of front seats 40. Rear footwells 49 may have a generally flat and/or level surface configuration for accommodating cargo storage and increasing the ease with which rear passengers may enter or exit vehicle 2, as will be described further with reference to FIG. 9. In other embodiments, rear footwells 49 may have an inclined, curved, or any other suitable configuration.

Figure 9:
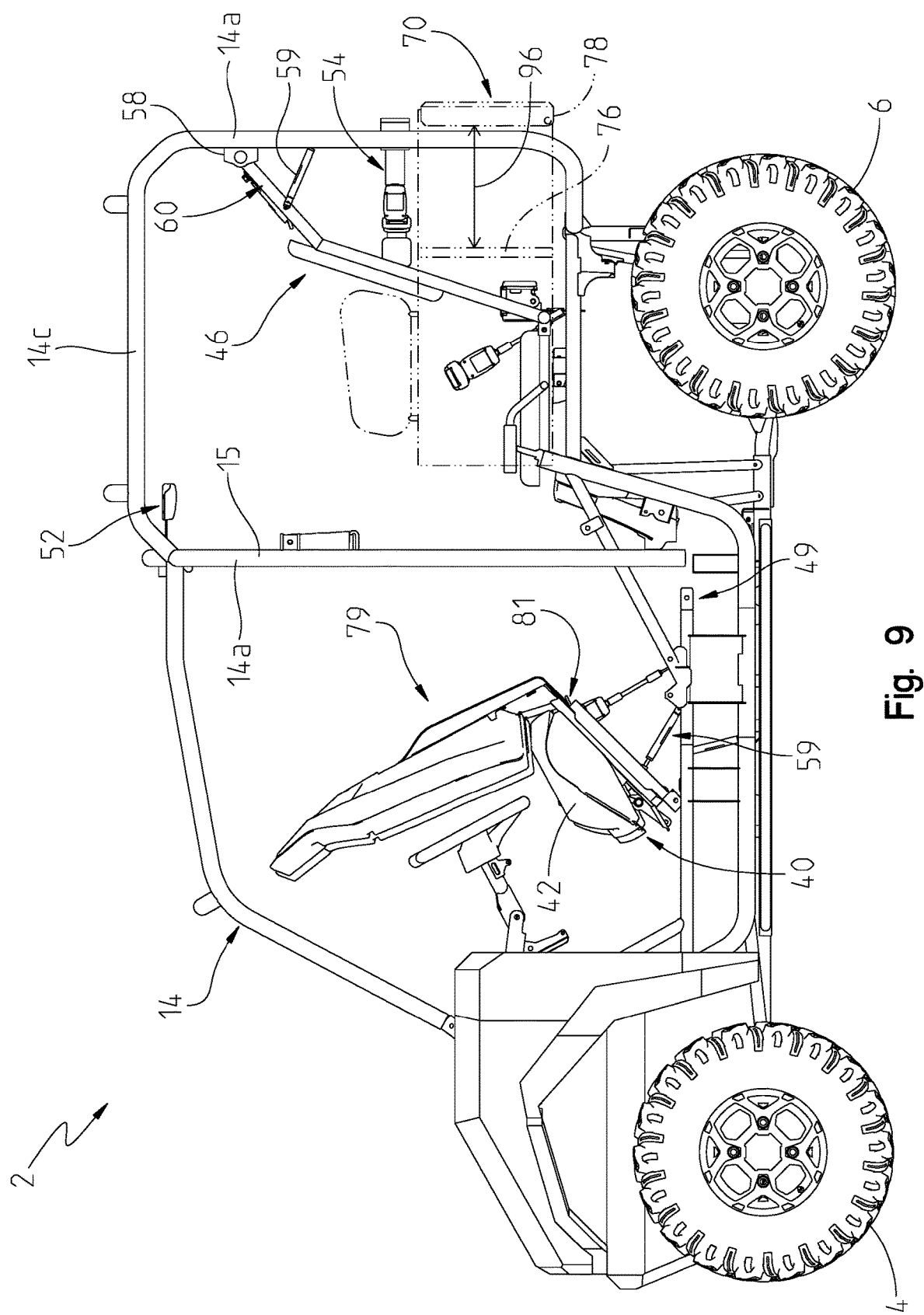
FIG. 9 is a left side view of the utility vehicle of FIG. 1 with a plurality of front seats in a forward position and the plurality of rear seats in the third position of FIG. 8.

FIG. 9 illustrates vehicle 2 with at least one of front seats 40 in a tilted position such that at least one of first front seat 40a and second front seat 40b is tilted forward. This allows for the creation of a pathway to rear seats 46 for the passengers to easily access rear seats 46. This pathway provides a method of both accessing and exiting rear seats 46 for passengers. In some embodiments, rear footwells 49 are positioned within the pathway such that rear passengers can stand on and be supported by rear footwells 49 while accessing or exiting rear seats 46. As previously mentioned, the generally flat and level surface of rear footwells 49 may increase the ease with which passengers can access rear seats 46 and/or cargo assembly 70. In these embodiments, vehicle 2 may comprise only front doors and omit the use of rear doors as a result of the use of the pathway to access rear seats 46 from the front doors. The tilting of front seats 40 is actuated through belts 79 positioned on a rear side of front seats 40. The positioning of belts 79 on rear surface of front seats 40 allows for easy access by the passengers while sitting in rear seats 46, as well as by the operator or passengers from outside vehicle 2. Belts 79 engage and couple to one or more latches 81 that are secured to each seat base 42 of front seats 40. In this way, belts 79 can be actuated and lifted upwards to disengage the connection with the one or more latches 81 which allows for front seats 40 to tilt forward. In various embodiments, at least one linear force element, illustratively shock member 59, is positioned between seat base 42 and a frame member of lower frame assembly 12 such that when front seats 40 are tilted forward, the at least one shock member 59 extends and supports front seats 40 forward. While illustrated as seatbelts, belts 79 may be chosen from a variety of products, materials, or configurations that allow for easy actuation of at least one of first and second front seats 40a, 40b. The pathway created for the passengers to access rear seats 46 may eliminate the need for rear doors which allows for maintaining an overall compact size of vehicle 2 when using rear seats 46, as well as allows for a reduction in the accumulation of dirt and/or debris on rear seats 46, among various other advantages. Additional details of belts 79 or other similar actuation mechanisms configured to allow front seats 40 to tilt or pivot forwardly, as shown in FIG. 9, may be disclosed in U.S. Pat. No. 8,905,435, issued on Dec. 9, 2014, the complete disclosure of which is expressly incorporated by reference herein.

Figure 10:
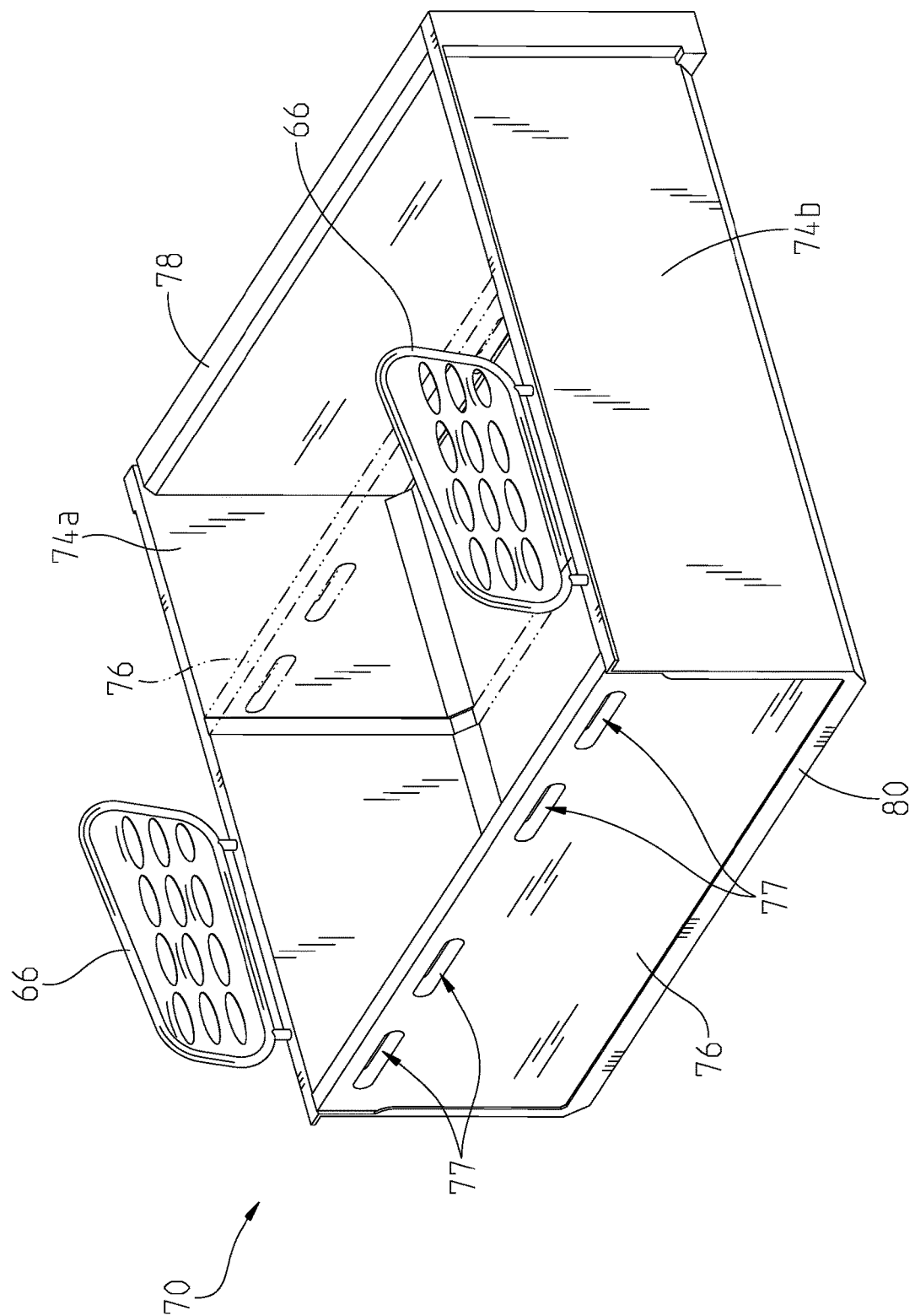
FIG. 10 is a perspective view of a cargo assembly of the utility vehicle of FIG. 1.

FIG. 10 illustrates a front left perspective view of cargo assembly 70. As illustrated, cargo assembly 70 comprises base 72, plurality of side panels 74, rear panel 78, and moveable panel 76, with deflection members 66 extending upwardly from side panels 74 of cargo assembly 70. In various embodiments, deflection members 66 may be mounted onto upper frame assembly 14, for example vertically extending frame members 14a, laterally extending frame members 14b and/or longitudinally extending frame members 14c. As illustrated in FIG. 10, moveable panel 76 is positioned at a forwardmost portion of cargo assembly 70, such that cargo assembly 70 has first base length 94, as described with reference to FIG. 6. Moveable panel 76 comprises a plurality of openings 77 that allow for the operator or the passenger(s) to lift and reposition moveable panel 76. FIG. 10 also illustrates, in phantom lines, the rearward position of moveable panel 76, shown in FIG. 8, when rear seats 46 are in the lowered position. As previously described, if moveable panel 76 is positioned in this configuration, cargo assembly 70 has an available storage space, or cargo area, defined by second base length 96 (FIG. 9), which is less than first base length 94 (FIG. 6). Cargo assembly 70 additionally comprises base 72 having longitudinal axis Y that may be transitioned from the neutral position to the tilted position, as previously described with reference to FIGS. 1-3.

Figure 11:
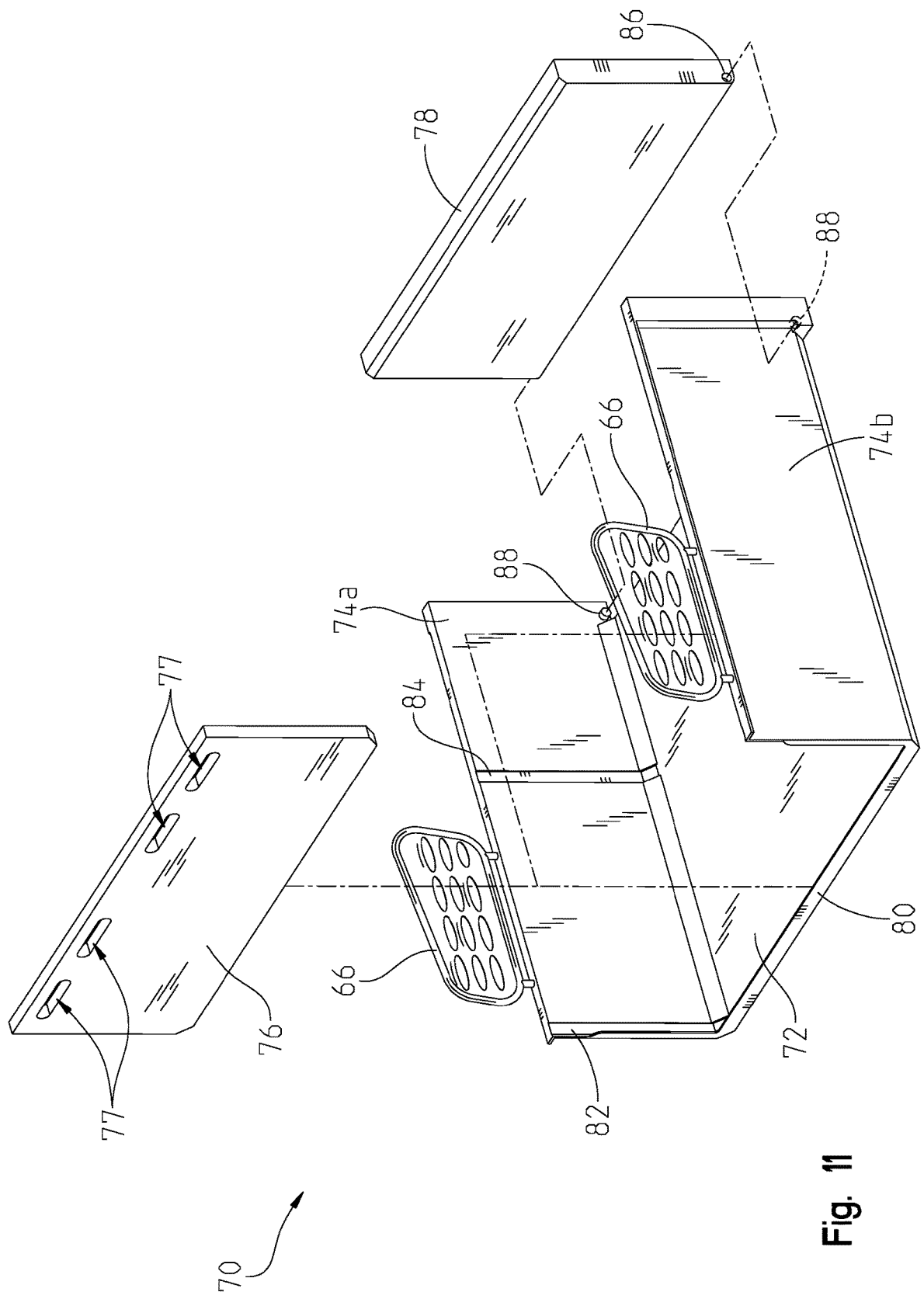
FIG. 11 is an exploded view of the cargo assembly of the utility vehicle of FIG. 10.

FIG. 11 illustrates an exploded view of cargo assembly 70. First and second side panels 74a, 74b are positioned opposite one another and each connected to base 72. In various embodiments, side panels 74a, 74b and base 72 are integrally formed while moveable panel 76 and rear panel 78 are removably coupled to base 72, as will be described further herein. Cargo assembly 70 may comprise a guard 80 adjacent a first slot 82, each extending along at least a portion of each first and second side walls 74a, 74b and along base 72 at the forwardmost end of base 72. Cargo assembly 70 further comprises a second slot 84 that extends upwards along first and second side walls 74a, 74b. Guard 80 is configured for inhibiting any liquids, materials, or products within cargo assembly 70 from leaking out of cargo assembly 70. First slot 82 is configured for receiving moveable panel 76 when rear seats 46 are positioned in the raised position, for example as illustrated in FIG. 8. Second slot 84 is configured for receiving moveable panel 76 when rear seats 46 are positioned in the lowered position, for example as illustrated in FIG. 6.

In various embodiments, rear panel 78 comprises a plurality of openings 86 configured for receiving a plurality of pins 88 of first and second side panels 74a, 74b. In these embodiments, rear panel 78 is operatively coupled to first and second side panels 74a, 74b such that the rear panel 78 may pivot outwardly and/or be removed. As previously disclosed with reference to FIG. 3, cargo assembly 70 may be positioned in the tilted position.

FIG. 12 is a perspective view of a portion of vehicle 2, specifically illustrating rear seats 46 including frame members 60 and positioned in a portion of cargo assembly 70. In the illustrative embodiment of FIG. 12, rear seats 46 are in the lowered position. Moveable panel 76 is positioned rearward of seat backs 50 of rear seats 46 such that the available cargo area/volume of cargo assembly 70 has second base length 96. Additionally, deflection members 66 are positioned extending upwardly from side panels 74 of cargo assembly 70 and at least partially laterally aligned with seat backs 50 of rear seats 46. Further, in the illustrative embodiment of FIG. 12, handles 62 are illustrated on either side of first rear seat 46a and second rear seat 46b. As illustrated, plurality of handles 62 includes a first handle 62a positioned on a right side of seat base 48 of second rear seat 46b, a second handle 62b positioned on a left side of seat base 48 of second rear seat 46b, a third handle 62c on a right side of first rear seat 46a, and a fourth handle 62d on a left side of first rear seat 46a. In other embodiments, plurality of handles 62 may include one, two, three, four, or more lower handles with varying positioning within vehicle 2.

Figure 13:
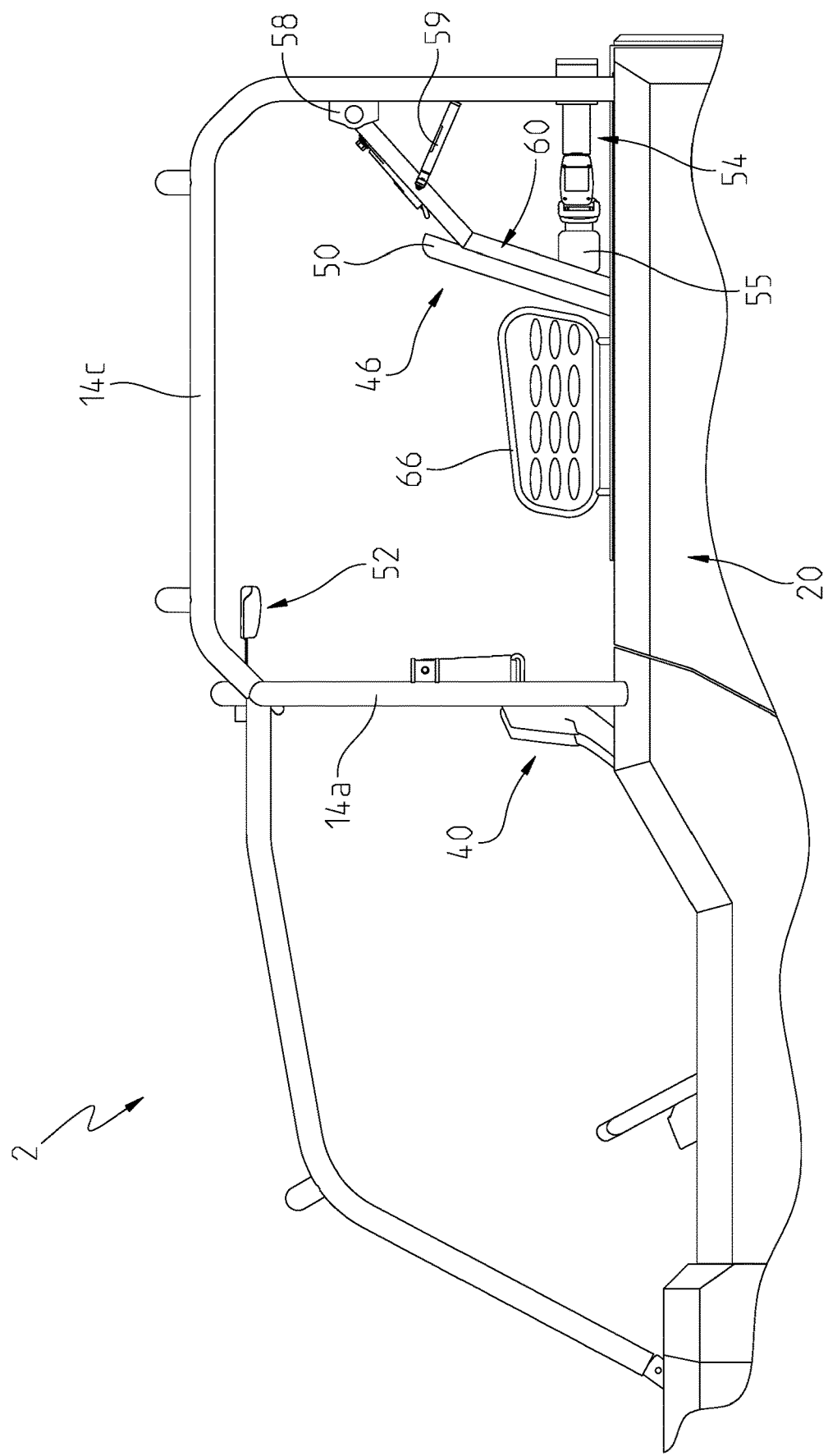
FIG. 13 is a left side view of a portion of the utility vehicle of FIG. 1 showing the plurality of rear seats of FIG. 7 in the second position.
Figure 14:
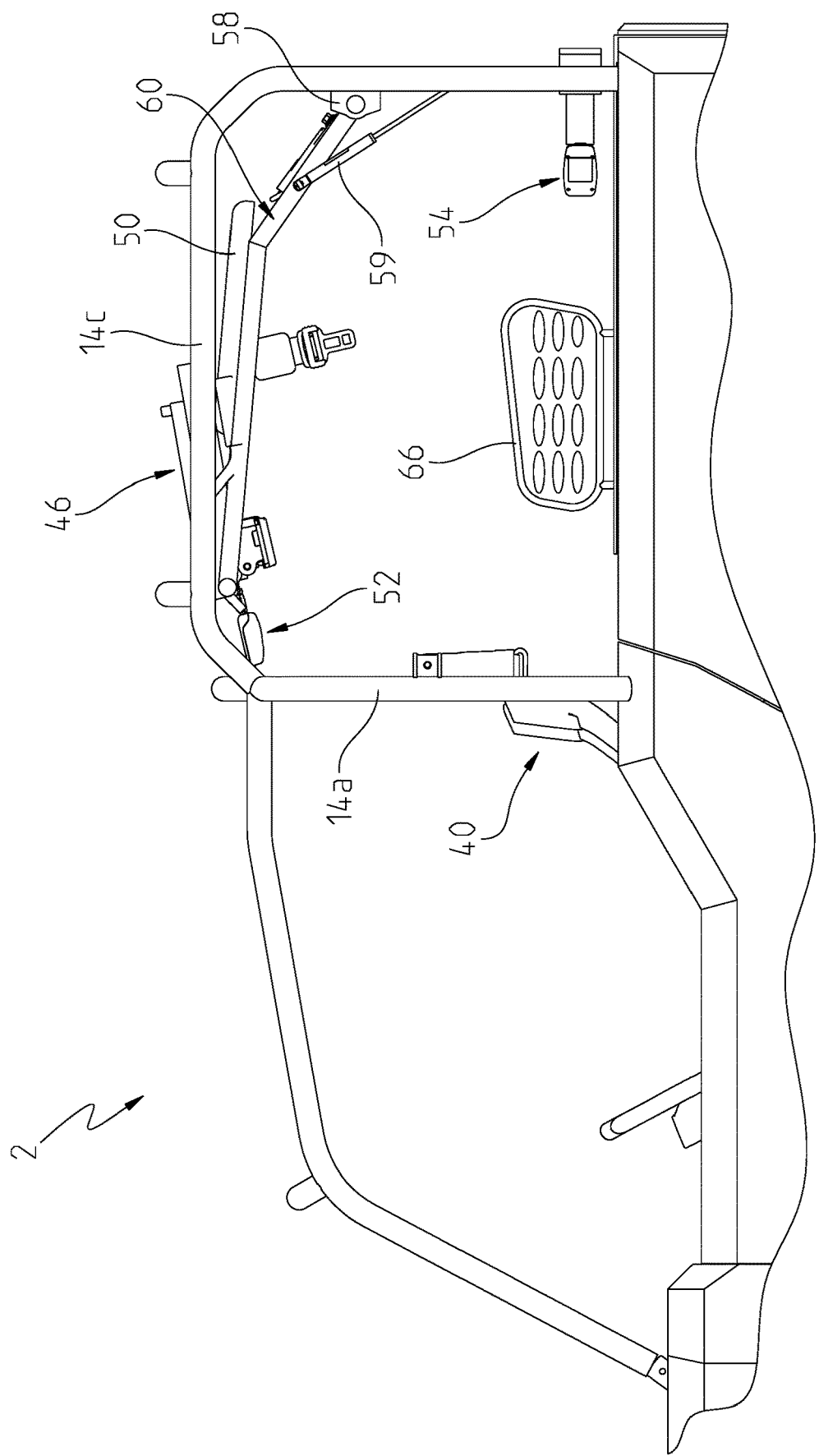
FIG. 14 is a left side view of a portion of the utility vehicle of FIG. 1 showing the plurality of rear seats of FIG. 6 in the first position.

FIGS. 13 and 14 illustrate a left side view of an upper portion of vehicle 2 with rear seats 46 in a lowered position and a raised position, respectively. In the embodiment of FIG. 13, the attachment assemblies 54 are secured onto upper frame assembly 14 and engaged with frame members 60 of rear seats 46. FIG. 14 illustrates rear seats 46 in the raised position such that attachment assemblies 54 are no longer engaged to secure frame members 60 to vertically extending frame members 14a of upper frame assembly 14. Coupler 52 is engaged with frame members 60 of rear seats 46 to maintain rear seats in the raised position. Frame members 60 are thus positioned directly and vertically above cargo assembly 70, such that in the raised position, frame members 60 define additional overhead framing or structure above cargo assembly 70, as previously described with reference to FIG. 3. Frame members 60 in the raised position may additionally provide protection from dirt or debris during operation of vehicle 2. Additionally, shock members 59 retain their engagement with both vertically extending frame members 14a of upper frame assembly 14 and frame members 60 of rear seats 46. Shock members 59 are positioned relatively extended in this configuration relative to the configuration of FIG. 13. Additional details regarding various components described herein may be disclosed in U.S. Application No. 63/168,525, filed on Mar. 31, 2021, and U.S. Pat. No. 9,725,023, issued on Aug. 8, 2017, the complete disclosures of which are expressly incorporated by reference herein.

It may be appreciated that other configurations of the first and second positions of rear seats 46 are possible. For example, rear seats 46 may be moved to the stowed position by pivoting rear seats 46 forwardly and stowing them directly rearward of front seats 40. In another example, rear seats 46 may be configured to pivot laterally such that rear seats 46 are positioned along one or more of the left and right sides of vehicle 2.

As previously described, other configurations of upper frame assembly 14 are possible for optimizing the space available for passengers of vehicle 2 and/or space available for supporting cargo within or on vehicle 2. For example, FIGS. 15-18 illustrate vehicle 2 having a modified or alternative upper frame assembly 14 compared to that shown generally in FIGS. 1-14. As illustrated, upper frame assembly 14 includes rear pair 17 of longitudinally extending frame members 14c extending at a vertical height H1 (relative to the ground surface) that is greater than a vertical height H2 (relative to the ground surface) of front pair 19 of longitudinally extending frame members 14c. Additionally, each of rear pair 17 of longitudinally extending frame members 14c are coupled with front pair 19 at a longitudinal position that is aligned with and/or forward of at least a portion of front seats 40. In other words, rear pair 17 of longitudinally extending frame members 14c vertically overlap at least partially with front pair 19 of longitudinally extending frame members 14c along a longitudinal distance of pairs 17, 19 at a location longitudinally rearward of a coupling point between pairs 17, 19. In this way, modified upper frame assembly 14 as shown in FIGS. 15-18 is defined by a "two level" configuration where pair 17 is spaced apart from pair 19 by a vertical distance d1. As such, vehicle 2 may have increased head room for at least rear passengers seated on rear seats 46 within operator area 22 while still being configured for allowing rear seats 46 to be secured within the raised position.

Figure 15:
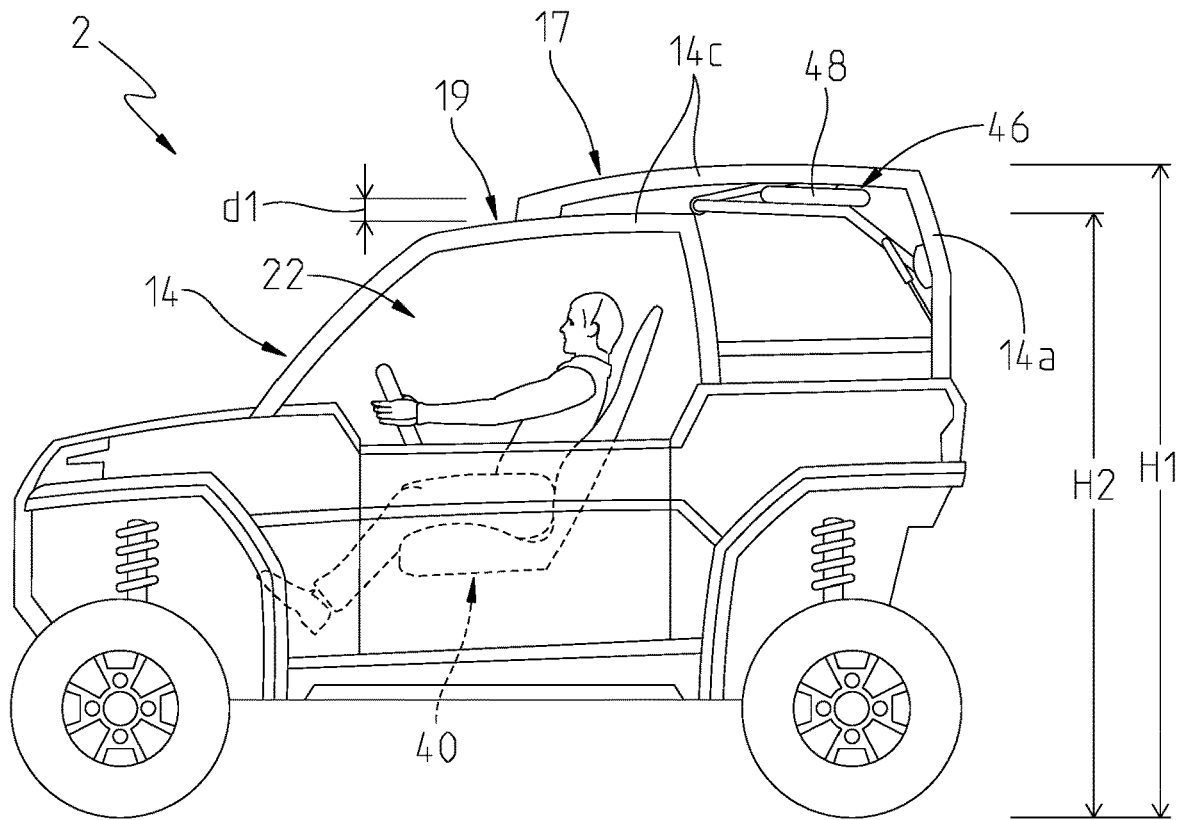
FIG. 15 is a left side view of the utility vehicle of FIG. 1 showing a modified upper frame assembly and the plurality of rear seats of FIG. 6 in the first position.
Figure 17:
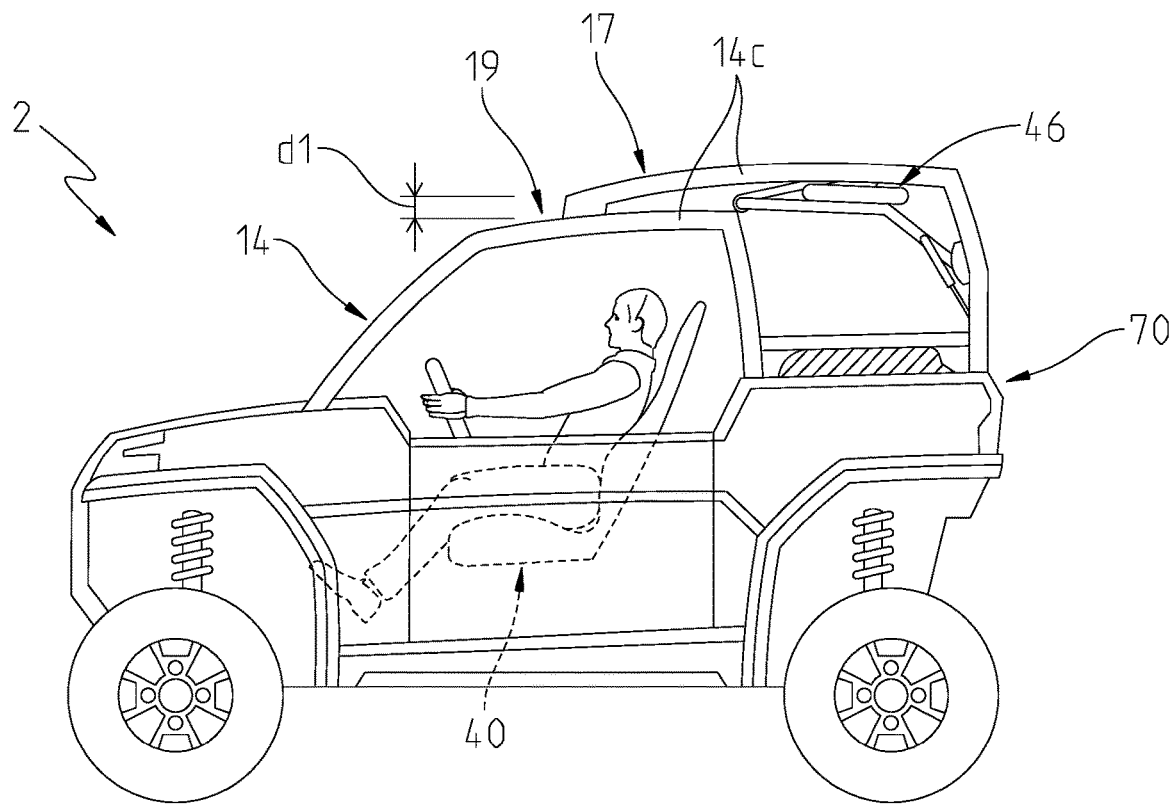
FIG. 17 is a left side view of the utility vehicle of FIG. 15 showing the plurality of rear seats of FIG. 6 in the first position and the cargo assembly in the first position.
Figure 18:
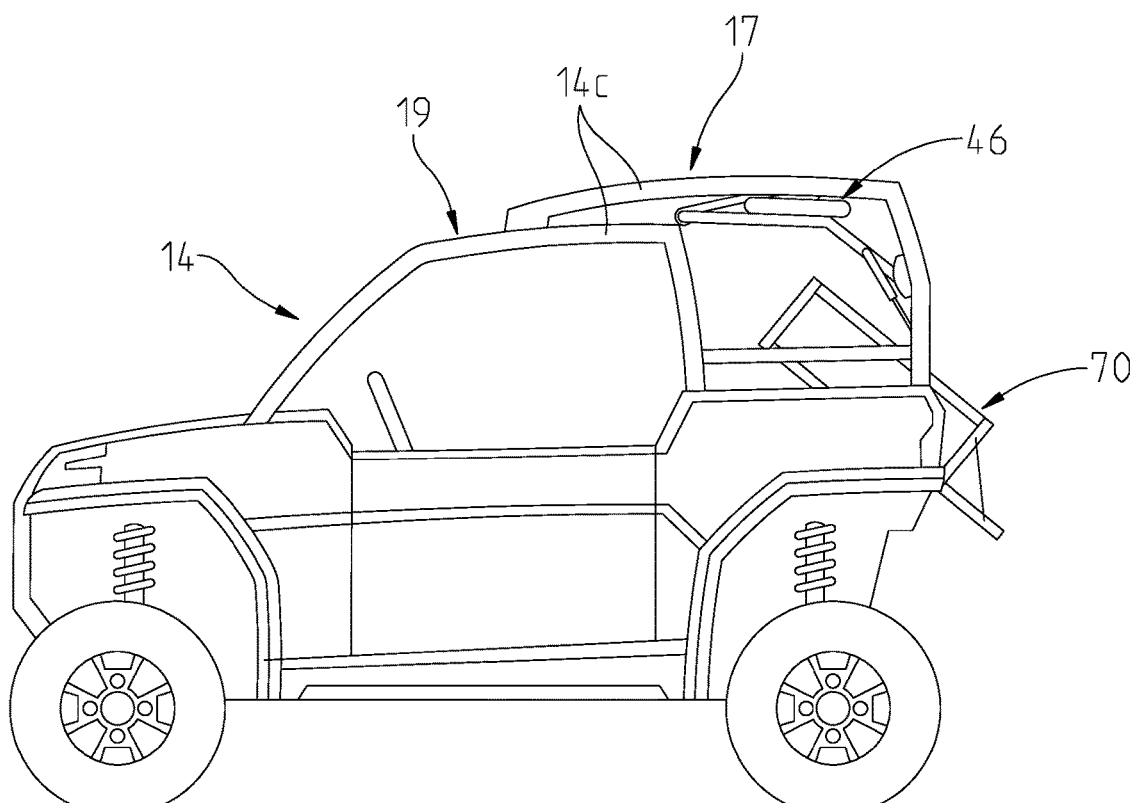
FIG. 18 is a left side view of the utility vehicle of FIG. 15 showing the cargo assembly in the second position.

For example, FIGS. 15 and 17-18 illustrate rear seats 46 arranged in the raised position and secured with upper frame assembly 14. Seat base 48 of rear seats 46 may be positioned at a vertical height that is higher than vertical height H2 of front pair 19 of longitudinally extending frame members 14c. This increases the area that is available for storing cargo within cargo assembly 70 along with allowing for cargo assembly 70 to be placed in the tilted position. For example, FIG. 18 illustrates rear seats 46 maintained within the raised configuration while cargo assembly 70 is tilted.

Figure 16:
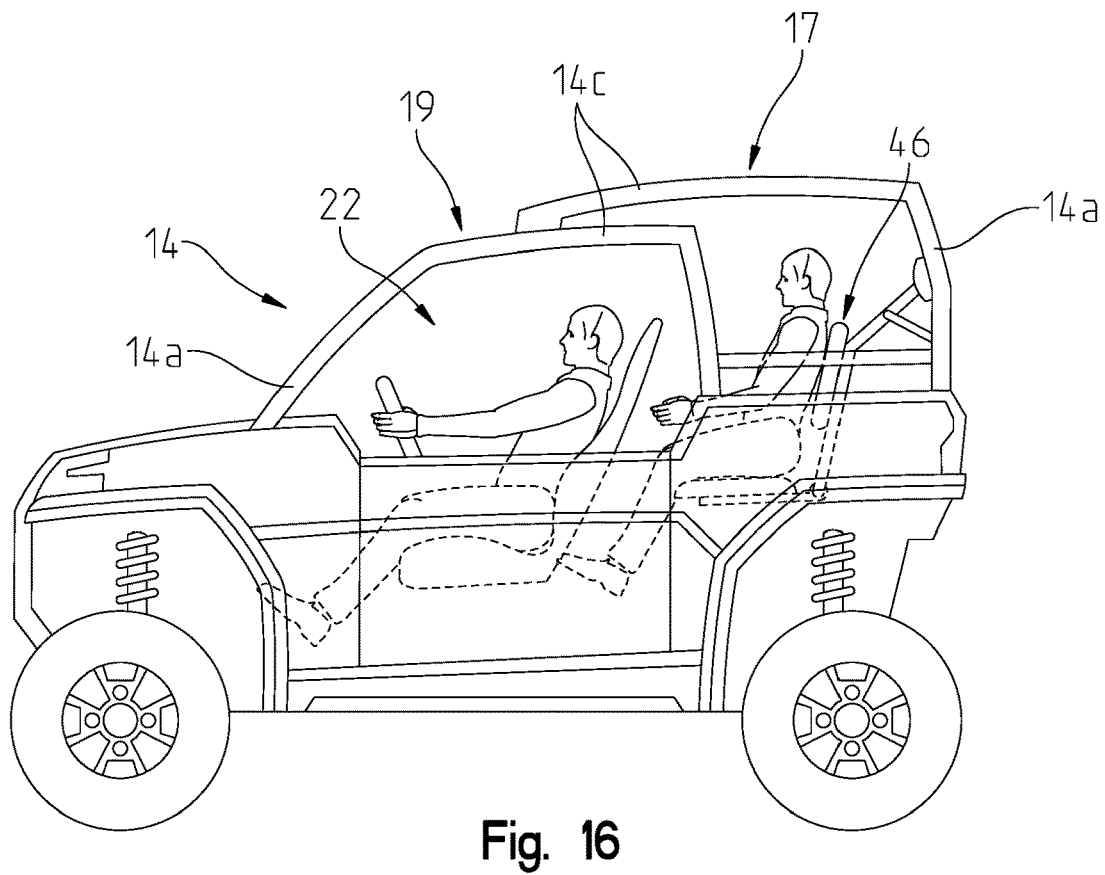
FIG. 16 is a left side view of the utility vehicle of FIG. 15 showing the plurality of rear seats of FIG. 6 in the second position.

Further, FIG. 16 illustrates rear seats 46 in the lowered position with at least one passenger positioned within rear seats 46. In these embodiments, the "two level" configuration of upper assembly 14 may increase the head room available for any passengers seated on rear seats 46. However, as previously mentioned, the "two level" configuration of upper assembly may also optimize the ability to support cargo on upper assembly 14, as will be described herein with reference to FIGS. 19-22.

Figure 19:
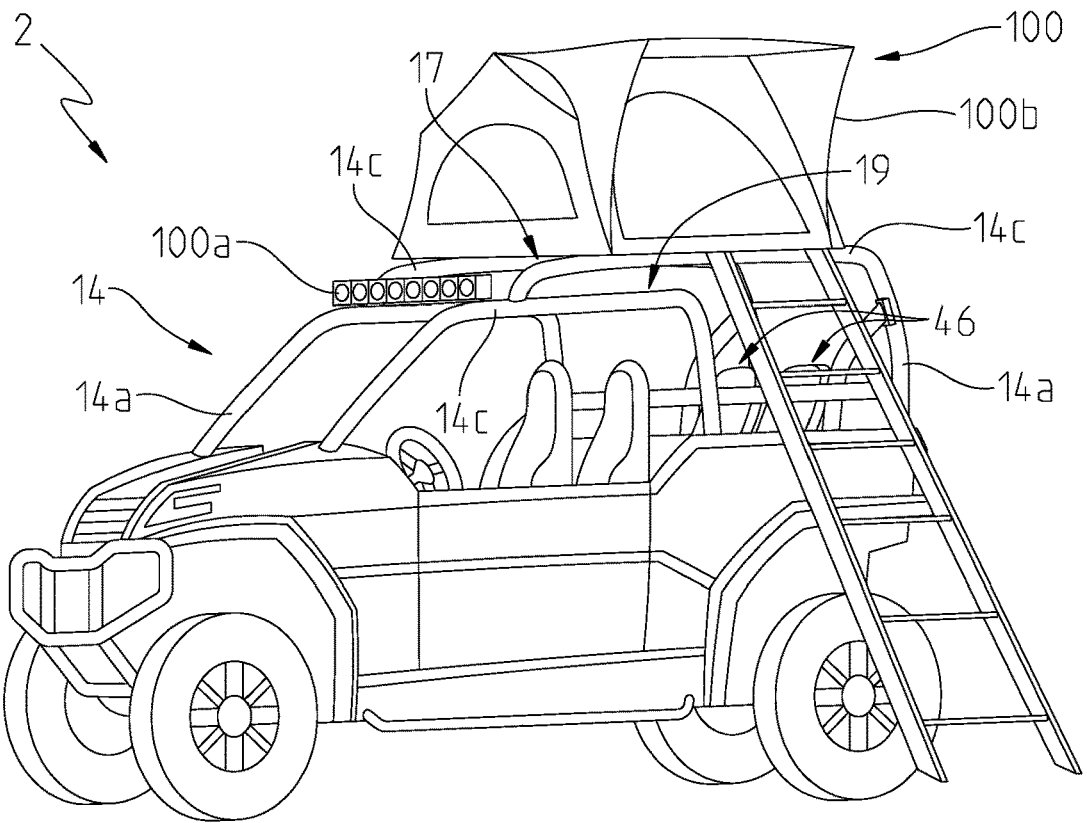
FIG. 19 is a left side view of the utility vehicle of FIG. 15 supporting at least one accessory.
Figure 20:
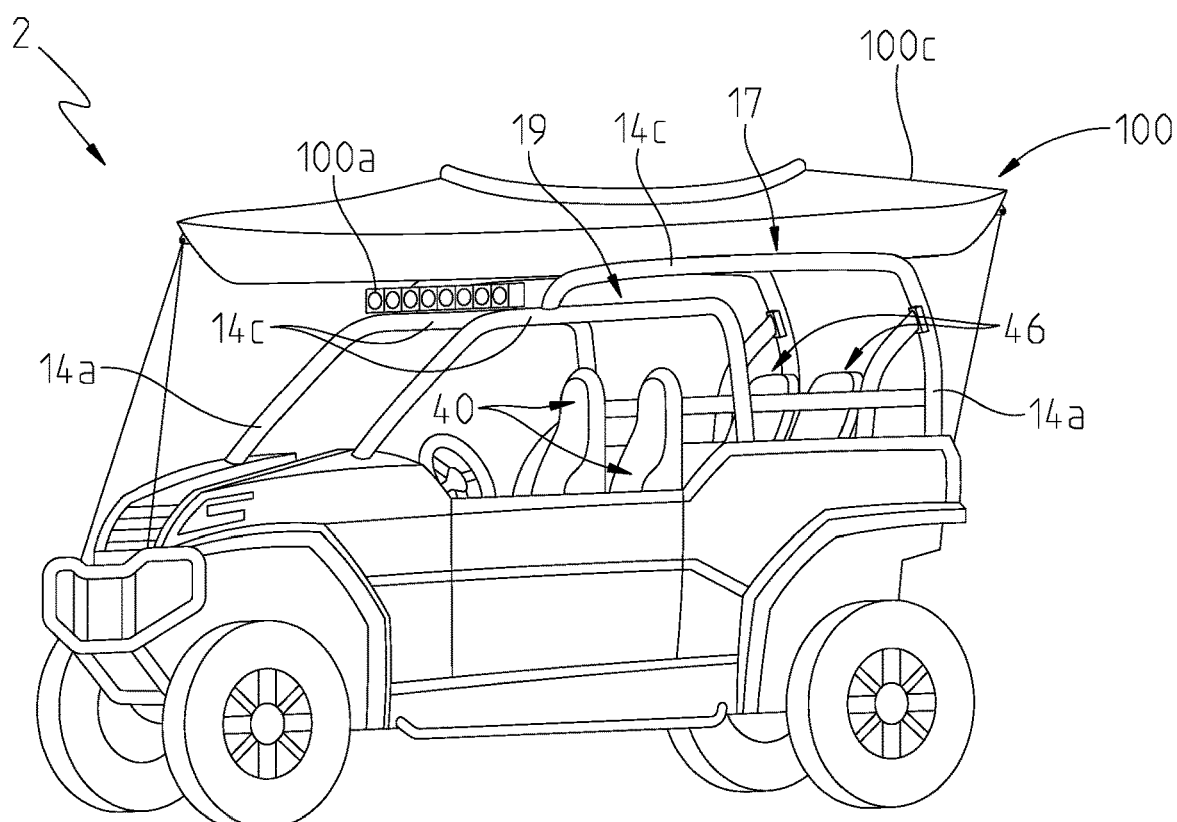
FIG. 20 is a further left side view of the utility vehicle of FIG. 15 supporting at least one accessory.
Figure 21:
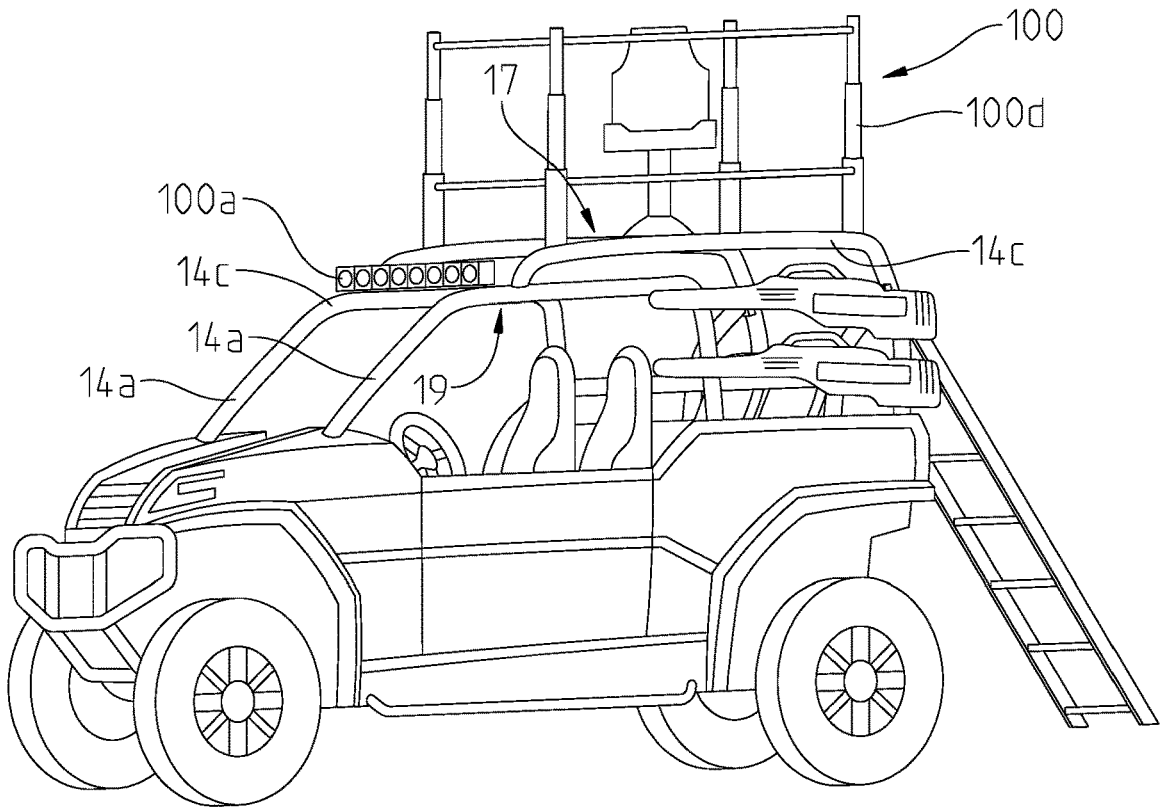
FIG. 21 is another left side view of the utility vehicle of FIG. 15 supporting at least one accessory.

As illustrated in FIG. 19, vehicle 2 may support a first accessory 100a, such as a light bar generally extending laterally between a portion of front pair 19 of longitudinally extending frame members 14c. Vehicle 2 may additional support a second accessory 100b, such as a tent, on top of rear pair 17 of longitudinally extending frame members 14c simultaneously. As a result of distance d1, second accessory 100b does not interact with or impede first accessory 100a and may be arranged vertically above it. For example, FIG. 20 illustrates vehicle 2 having upper frame assembly 14 with the "two level" configuration and a third accessory 100c, illustratively a kayak, extending vertically above and longitudinally forward of light bar 100a. However, various other accessories may alternatively or additionally be supported on vehicle 2. For example, FIG. 21 illustrates a fourth accessory 100d, illustratively a hunting platform, supported on upper assembly 14. As illustrated, upper frame assembly 14 may also support smaller cargo items such as gun cases along a side of upper assembly 14.

Figure 22:
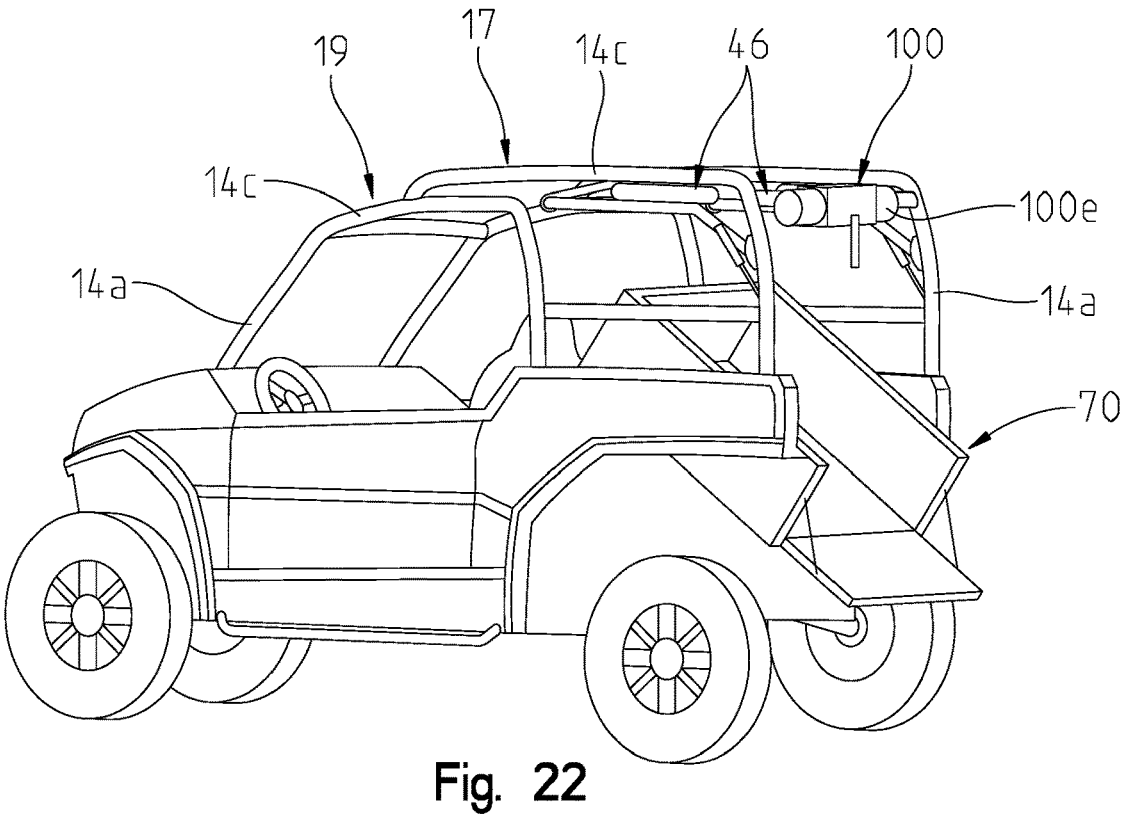
FIG. 22 is a left rear perspective view of the utility vehicle of FIG. 15 supporting at least one accessory and showing the cargo assembly in the second position.
Figure 23:
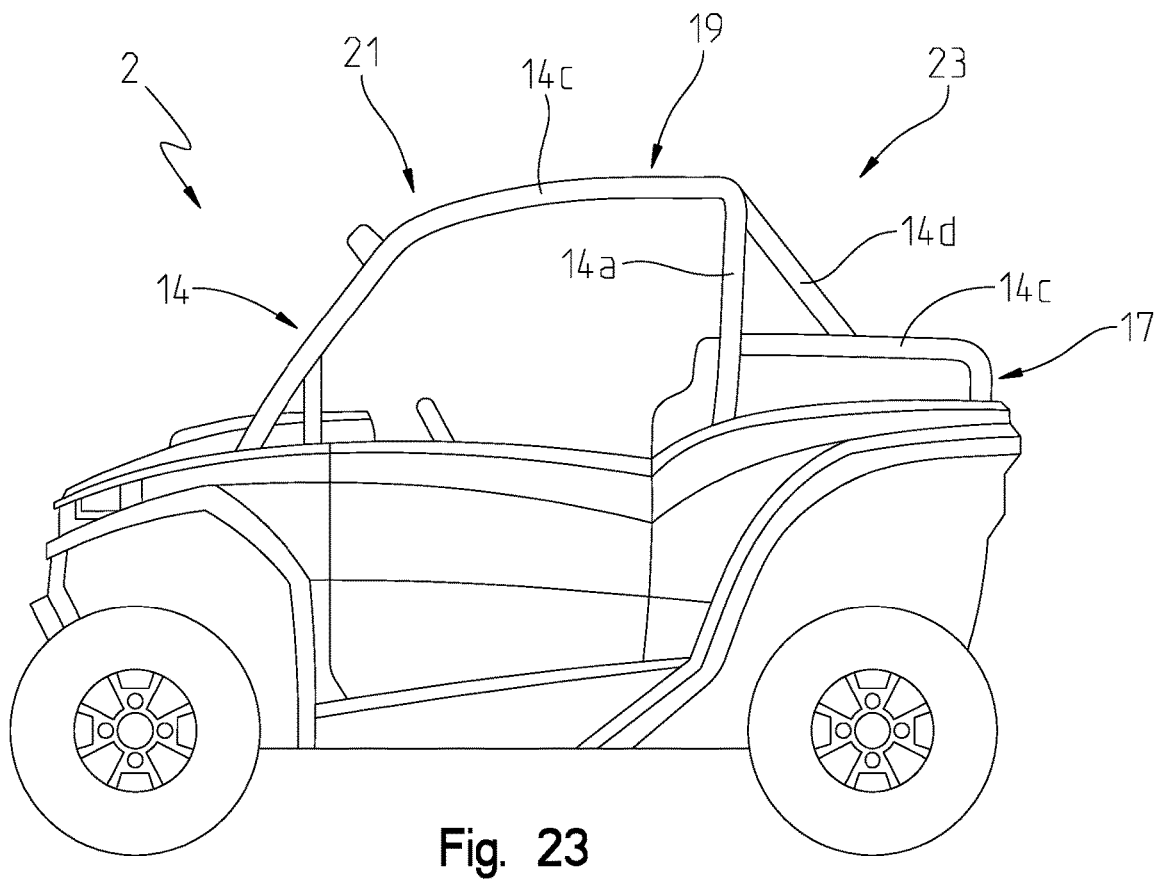
FIG. 23 is a left side view of a utility vehicle having a modified upper frame assembly.

With reference to FIG. 22, a fifth accessory 100e, illustratively a winch, may also be supported by upper frame assembly 14. Winch 100e may be used to at least aid in loading large cargo into and/or unloading large cargo out of cargo assembly 70. For example, winch 100e may couple with or support large cargo and lift the cargo into cargo assembly 70 or lower the cargo out of cargo assembly 70. In this way, winch 100e may provide an assist for loading heavy cargo or dumping heavy cargo into cargo assembly 70. In these embodiments, rear seats 46 may be secured in the raised position to ensure cargo assembly 70 has sufficient clearance to raise and/or lower cargo assembly, especially if large cargo is contained therein.

Even further, various other configurations of upper frame assembly 14 may be incorporated with vehicle 2, as will be described with reference to FIGS. 23-26. In these embodiments, upper frame assembly 14 may include a front portion 21 and a rear portion 23. Front portion 21 and rear portion 23 may be modular such that one or both of front and rear portions 21, 23 may manufactured and assembly with vehicle 2 separately. Illustratively, upper frame assembly 14 of FIG. 23 may be designed for enclosing front seats 40 within vehicle 2, as front portion 21 includes longitudinally extending frame members 14c and vertically extending frame members 14a for surrounding operator area 22. Rear portion 23 may include diagonally extending frame members 14d extending from front pair 19 of longitudinally extending frame members 14c to rear pair 17 of longitudinally extending frame members 14c.

Figure 24:
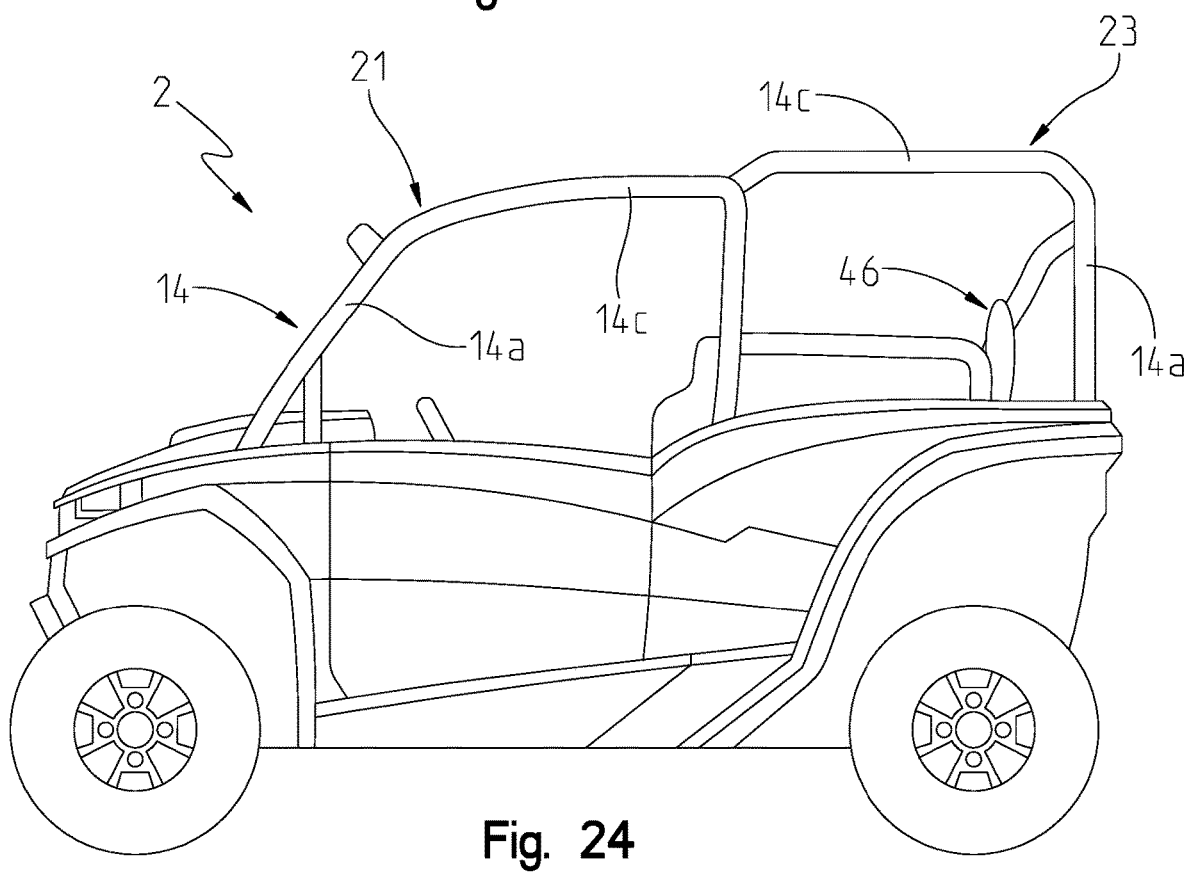
FIG. 24 is another left side view of the utility vehicle of FIG. 1 having a modified upper frame assembly.
Figure 26:
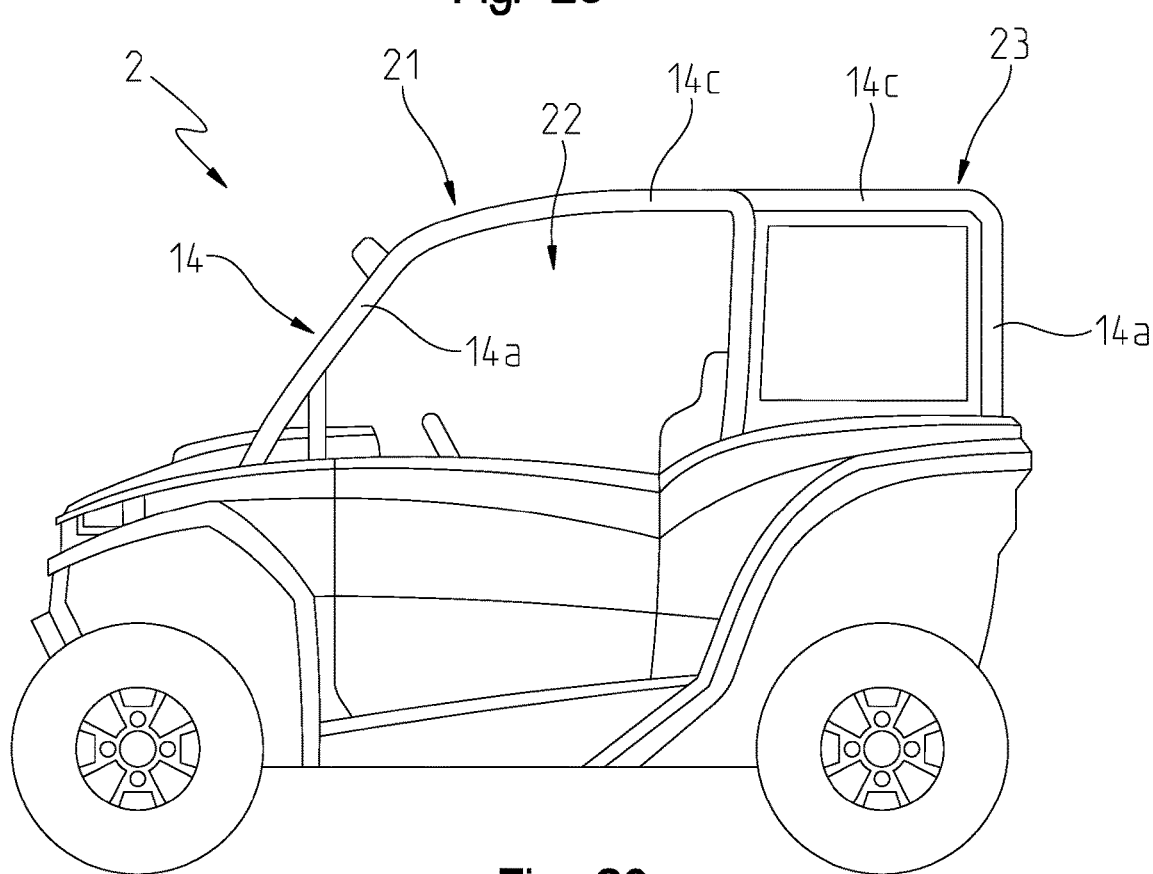
FIG. 26 is a further left side view of the utility vehicle of FIG. 1 having a modified upper frame assembly.

FIG. 24 illustrates an additional embodiment of upper frame assembly 14 including front portion 21 and rear portion 23, where front portion 21 and rear portion 23 may be configured for accommodating both front seats 40 and rear seats 46. As illustrated, upper frame assembly 14 may have the "two level" configuration of FIGS. 15-18. However, in some embodiments, upper frame assembly 14 may define a "one level" configuration, as illustrated in FIG. 26 for example, in which front and rear portions 21, 23 have the same vertical height relative to the ground surface.

Figure 25:
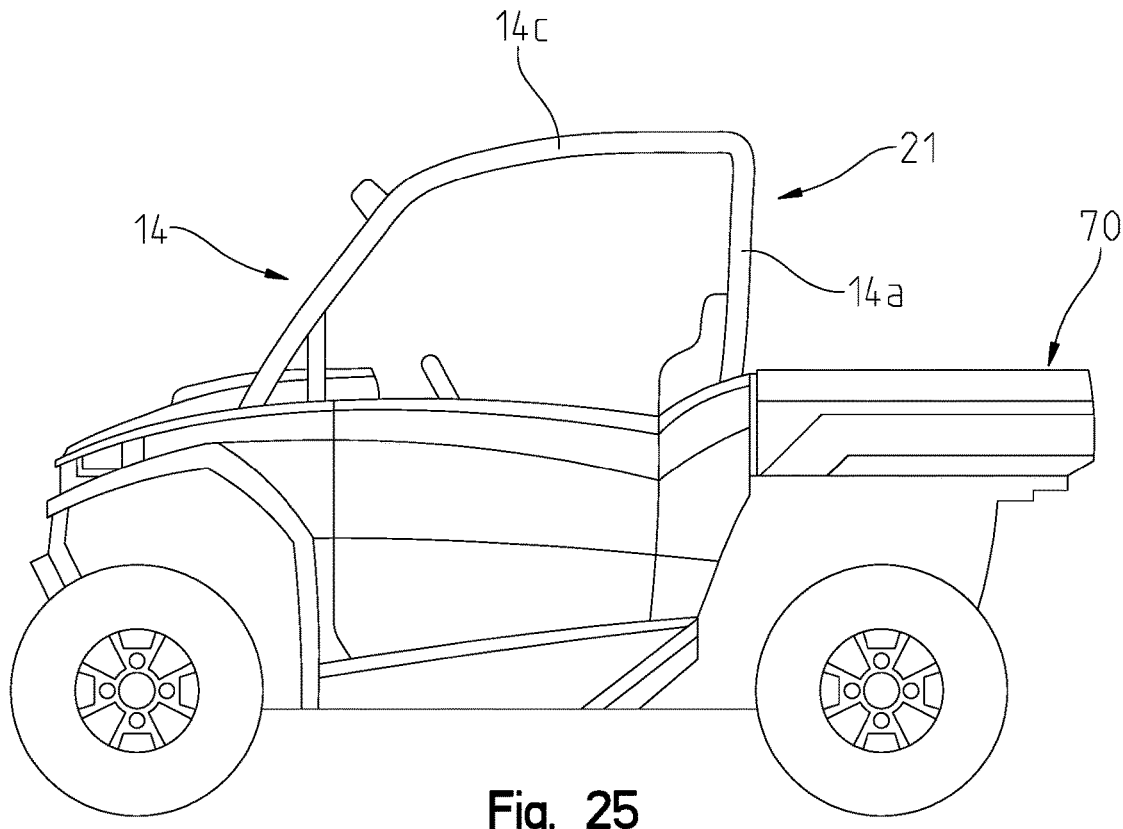
FIG. 25 is a further left side view of a utility vehicle having a modified upper frame assembly.

Even further, in some embodiments, only front portion 21 of upper frame assembly 14 is incorporated with vehicle 2. For example, FIG. 25 illustrates vehicle 2 with front portion 21 of upper frame assembly and no rear portion 23. In this way, cargo assembly 70 is not surrounded by upper frame assembly 14. The above described embodiments of the modular portions of upper frame assembly 14 (FIGS. 23-26) may allow for various configurations of upper frame assembly 14 to meet different user preferences and applications for vehicle 2. However, the above described configurations are meant only as examples and various other configurations for upper frame assembly 14 may also be incorporated.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
a frame including a rollover protective structure;
a plurality of seats supported by the frame and comprising at least one front seat and at least one rear seat assembly, the at least one rear seat assembly comprising: a frame member pivotably coupled to the rollover protective structure at a first end, the frame member supporting a seat back and a seat base, wherein the rear seat assembly is transitionable between a lowered position and a raised position;
wherein the raised position is defined by the frame member being pivoted upward relative to the protective structure, with the seat back collapsed against the seat base in proximity to a top of the rollover protective structure, and
wherein the lowered position is defined by the frame member being pivoted downward relative to the protective structure, with the seat base and seat back positioned to receive an occupant, and
wherein the rear seat assembly further comprises a raised attachment assembly connection member positioned in proximity to a second end of the frame member, the raised attachment assembly connection member configured to secure the rear seat assembly to the rollover protective structure in the raised position.

2. The vehicle of claim 1, wherein the raised position is defined by the rear seat assembly being positioned at a first vertical height greater than a vertical height of the at least one front seat.

3. The vehicle of claim 1, wherein, in the lowered position, the at least one rear seat assembly is coupled to the rollover protective frame through at least one lowered attachment assembly coupling member.

4. The vehicle of claim 3, wherein the rear seat assembly includes two lowered attachment assembly coupling members.

5. The vehicle of claim 3, wherein, in the raised position, the at least one lowered attachment assembly is disengaged.

6. The vehicle of claim 1, wherein the frame member extends laterally across the vehicle.

7. The vehicle of claim 1, wherein when the rear seat assembly is in the raised position, the frame member is positioned at a first vertical height, and wherein when the rear seat assembly is in the lowered position, the frame member is positioned at a second vertical height, the first vertical height greater than the second vertical height.

8. The vehicle of claim 1, wherein when the rear seat assembly is in the lowered position, the seat base is positioned in proximity to an interior floor of the vehicle.

9. The vehicle of claim 1, wherein the vehicle comprises cargo bed is an open-air cargo bed.

10. A vehicle, comprising:
a frame;
a plurality of ground-engaging members supporting the frame;
a body assembly supported by the frame;
a plurality of seats including at least one front seat and at least one rear seat,
a frame assembly supporting at least the at least one rear seat, the frame assembly and the at least one rear seat being moveable from a first position to a second position; and
a cargo assembly defining a plurality of upstanding walls and a base, the cargo assembly configured to move between a condensed position and an expanded position, wherein movement of the cargo assembly is independent of movement of the at least one rear seat,
wherein, in the first position, the frame assembly is positioned at a vertical height greater than a vertical height of the at least one front seat and the frame assembly is coupled to the frame of the vehicle at a first coupling position, and
wherein, in the second position, the frame assembly is positioned at least partially longitudinally rearward of the at least one front seat and the frame assembly is coupled to the frame at a second coupling position, the second coupling position being spaced from the first coupling position;
wherein, in the first position, the frame assembly is reversibly coupled to the frame of the vehicle with a coupler positioned on a laterally extending frame member of the frame, the coupler positioned at a vertical height greater than the vertical height of the at least one front seat, and wherein the frame assembly is coupled to the frame of the vehicle through a seatbelt attachment assembly.

11. The vehicle of claim 10, wherein, in both the first position and the second position, the at least one rear seat is coupled to the frame of the vehicle through at least two shock members.

12. The vehicle of claim 10, wherein, in the second position, the frame assembly is reversibly coupled to the frame of the vehicle with at least one attachment assembly positioned longitudinally rearward of at least a portion of the at least one front seat.

13. The vehicle of claim 12, wherein the at least one attachment assembly comprises a first coupling member coupled to the frame and a second coupling member coupled to the rear seat, the first and second coupling members removably coupled.

14. The vehicle of claim 10, wherein the cargo assembly is configured to tilt relative to a longitudinal axis.

15. The vehicle of claim 10, wherein the cargo assembly includes a movable panel movable between a first position and a second position, wherein when the movable panel is in the first position, a first boundary is defined between the at least one front seat and a first side of the movable panel and a second boundary is defined from a second side of the movable panel opposite the first side and an end of the vehicle.

16. A vehicle, comprising:
    a frame supporting an operator area having a plurality of seats including at least one rear seat and at least one front seat, the at least one rear seat being moveable from a raised position to a lowered position,
    a plurality of ground engaging members supported by the frame,
    a body assembly comprising a plurality of body panels supporting the frame,
    a cargo assembly supported by the frame and comprising at least two upwardly extending side panels, and a base, and a moveable panel extending upwardly from the base,
    wherein the moveable panel is moveable from a first position to a second position such that when in a first position, a longitudinal length of the cargo assembly is increased, and when in the second position, the longitudinal length of the cargo assembly is decreased relative to in the first position, and
    wherein, when the rear seat is in the raised position, the moveable panel is operable to move between the first position and the second position, and when the rear seat is in the lowered position, the moveable panel is in the second position
    wherein in the first position, the moveable panel is engaged with a first slot and wherein in the second position, the movable panel is engaged with a second slot, wherein the second slot is positioned closer to a longitudinal center of base than the first slot.

17. The vehicle of claim 16, wherein, when in the lowered position, the at least one rear seat is longitudinally rearward of the at least one front seat, and wherein, when in the raised position, the at least one rear seat is positioned at a vertical height greater than the vertical height of the at least one front seat.

18. The vehicle of claim 16, wherein when the at least one rear seat is in the lowered position and the moveable panel is in the second position, the seat base of the at least one rear seat is positioned directly above the base of cargo assembly.

19. The vehicle of claim 16, wherein the base of the cargo assembly comprises a leak guard positioned forward of the moveable panel configured to inhibit contents of the cargo assembly from exiting cargo assembly.

20. The vehicle of claim 16, wherein, when the at least one rear seat is in the raised position, the cargo assembly is operable to transition from a neutral position defined as extending along a longitudinal axis of the vehicle to a tilted position defined as extending along an axis angled relative to the longitudinal axis of the vehicle.

21. The vehicle of claim 16, wherein the moveable panel is removably coupled to the base.

* * * * *